(12) United States Patent
Ryu

(10) Patent No.: US 10,021,300 B2
(45) Date of Patent: Jul. 10, 2018

(54) IMAGE PROCESSING DEVICE AND ELECTRONIC SYSTEM INCLUDING THE SAME

(71) Applicant: Samsung Electronics Co., Ltd., Suwon-si, Gyeonggi-do (KR)

(72) Inventor: Se-Un Ryu, Seongnam-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 69 days.

(21) Appl. No.: 15/204,287

(22) Filed: Jul. 7, 2016

(65) Prior Publication Data

US 2017/0061703 A1    Mar. 2, 2017

(30) Foreign Application Priority Data

Aug. 27, 2015 (KR) .................... 10-2015-0120918

(51) Int. Cl.
| | | |
|---|---|---|
| *G06K 9/00* | (2006.01) | |
| *H04N 5/232* | (2006.01) | |
| *G06T 3/40* | (2006.01) | |
| *H04N 5/262* | (2006.01) | |
| *G06T 7/194* | (2017.01) | |

(52) U.S. Cl.
CPC ....... *H04N 5/23238* (2013.01); *G06T 3/4038* (2013.01); *G06T 7/194* (2017.01); *H04N 5/2624* (2013.01); *H04N 5/2628* (2013.01); *G06T 2207/10024* (2013.01); *G06T 2207/10028* (2013.01)

(58) Field of Classification Search
CPC ............ H04N 5/23212; H04N 5/23238; G06T 3/4038; G06T 11/60; G06T 2207/20221
USPC ..... 358/452, 453, 3.24; 348/49; 375/240.16; 382/106
See application file for complete search history.

(56) References Cited

U.S. PATENT DOCUMENTS

| | | | |
|---|---|---|---|
| 6,031,541 A | 2/2000 | Lipscomb et al. | |
| 6,639,596 B1 | 10/2003 | Shum et al. | |
| 7,010,158 B2 | 3/2006 | Cahill et al. | |
| 8,494,051 B2* | 7/2013 | Li | H04N 19/513 375/240.16 |
| 8,605,105 B2 | 12/2013 | Hong et al. | |
| 8,717,405 B2 | 5/2014 | Li et al. | |
| 8,811,771 B2* | 8/2014 | Shechtman | G06T 13/80 382/118 |
| 8,890,868 B2 | 11/2014 | Barenburg et al. | |

(Continued)

FOREIGN PATENT DOCUMENTS

JP    2015-049716 A    3/2015

*Primary Examiner* — Charlotte M Baker
(74) *Attorney, Agent, or Firm* — Harness, Dickey & Pierce, P.L.C.

(57) ABSTRACT

An image processing device includes an image segmentation unit, a stitching unit and a rendering unit. The image segmentation unit divides a plurality of input images into a plurality of first images and a plurality of second images based on color information and depth information. The plurality of input images are sequentially captured. The stitching unit generates a first panoramic image by synthesizing the plurality of first images, and generates a second panoramic image by synthesizing the plurality of second images. The rendering unit generates an output panoramic image based on the first panoramic image and the second panoramic image.

18 Claims, 22 Drawing Sheets

(56) References Cited

U.S. PATENT DOCUMENTS

| | | |
|---|---|---|
| 8,928,729 B2 | 1/2015 | Schnyder et al. |
| 2013/0250045 A1 | 9/2013 | Ki et al. |
| 2014/0118482 A1 | 5/2014 | Noh et al. |
| 2014/0285486 A1 | 9/2014 | Chang et al. |
| 2015/0156415 A1 | 6/2015 | Gallup et al. |

* cited by examiner

IMG13

IMG21

IMAGE PROCESSING DEVICE AND ELECTRONIC SYSTEM INCLUDING THE SAME

CROSS-REFERENCE TO RELATED APPLICATION

This application claims priority under 35 USC § 119 to Korean Patent Application No. 10-2015-0120918, filed on Aug. 27, 2015 in the Korean Intellectual Property Office (KIPO), the contents of which are herein incorporated by reference in their entirety.

BACKGROUND

1. Technical Field

Example embodiments relate generally to image processing. For example, at least some example embodiments relate to image processing devices and/or electronic systems including the image processing devices.

2. Description of the Related Art

Image recording devices have been adopted in various electronic systems and mobile systems. Recently, research has been conducted on an image recording device which can obtain distance information of an object as well as image information of the object. The image which is recorded by the image recording device can be processed in various ways. For example, a plurality of recorded images can be synthesized to represent a panoramic effect in a composite image, and/or a recorded image can be processed to represent a three-dimensional (3D) perspective effect. However, conventional processing on a panoramic image may not scale differently scale different portions of the panoramic image, and/or such processing may be burdensome.

SUMMARY

Accordingly, the present disclosure is provided to reduce (or, alternatively, substantially obviate) one or more problems due to limitations and disadvantages of the related art.

At least one example embodiment of the present disclosure provides an image processing device capable of efficiently representing a panoramic effect and/or a three-dimensional (3D) perspective effect with relatively small calculation and cost.

At least one example embodiment of the present disclosure provides an electronic system including the image processing device.

In some example embodiments, the image processing device may include an image segmentation unit configured to divide a plurality of input images into first images and second images based on color information and depth information, the plurality of input images being sequentially captured and received by the image processing device; a stitching unit configured to generate a first panoramic image and a second panoramic image by synthesizing the first images and the second images, respectively; and a rendering unit configured to generate an output panoramic image based on the first panoramic image and the second panoramic image.

In some example embodiments, the image segmentation unit may include a color segmentation unit configured to generate a plurality of color data by performing a color classification on the plurality of input images based on the color information; and a clustering unit configured to generate a plurality of first image data and a plurality of second image data based on the plurality of color data and the depth information, the plurality of first image data corresponding to the first images, the plurality of second image data corresponding to the second images.

In some example embodiments, the stitching unit may include a first stitching unit configured to generate first panoramic image data corresponding to the first panoramic image based on a plurality of first image data corresponding to the first images; and a second stitching unit configured to generate second panoramic image data corresponding to the second panoramic image based on a plurality of second image data corresponding to the second images.

In some example embodiments, the stitching unit includes a first stitching unit configured to, generate first panoramic image data corresponding to the first panoramic image based on a plurality of first image data corresponding to the first images, and generate second panoramic image data corresponding to the second panoramic image based on a plurality of second image data corresponding to the second images; and a storage unit configured to store the first panoramic image data and the second panoramic image data.

In some example embodiments, the rendering unit is configured to generate the output panoramic image by, combining the first panoramic image with the second panoramic image without scaling same, or scaling the first and second panoramic images with different ratios based on a first scaling value and a second scaling value, and combining the scaled first panoramic image with the scaled second panoramic image to generate the output panoramic image.

In some example embodiments, the rendering unit includes a first scaling unit configured to generate a first conversion image by resizing the first panoramic image based on the first scaling value; a second scaling unit configured to generate a second conversion image by resizing the second panoramic image based on the second scaling value, the second scaling value being different from the first scaling value; and a blending unit configured to generate the output panoramic image by combining one of the first panoramic image with the second panoramic image and the first conversion image with the second conversion image.

In some example embodiments, the first conversion image is an enlarged image of the first panoramic image, and the second conversion image is an enlarged image of the second panoramic image, and the first scaling value indicating a magnification factor for the first panoramic image is greater than the second scaling value indicating a magnification factor for the second panoramic image.

In some example embodiments, the rendering unit further includes a mode selection unit configured to select images that are combined by the blending unit.

In some example embodiments, the rendering unit includes a first scaling unit configured to, generate a first conversion image by resizing the first panoramic image based on the first scaling value, and generate a second conversion image by resizing the second panoramic image based on the second scaling value different from the first scaling value; a blending unit configured to generate the output panoramic image by combining one of the first panoramic image with the second panoramic image and the first conversion image with the second conversion image; and a storage unit configured to store first conversion image data corresponding to the first conversion image and second conversion image data corresponding to the second conversion image.

In some example embodiments, the image processing device further includes a scaling value generation unit configured to determine the first scaling value for the first panoramic image and the second scaling value for the second panoramic image based on the depth information.

In some example embodiments, the image segmentation unit is further configured to determine the first scaling value for the first panoramic image and the second scaling value for the second panoramic image based on the depth information.

In some example embodiments, the image processing device the first images and the first panoramic image are associated with an object in the plurality of input images, and the second images and the second panoramic image are associated with a background other than the object in the plurality of input images.

In some example embodiments, the image processing device further includes an image pickup device configured to obtain the color information and the depth information associated with the plurality of input images.

In some example embodiments, the image processing device further includes an image pickup device configured to obtain the color information associated with the plurality of input images; and a depth measurement device configured to obtain the depth information associated with the plurality of input images.

Some example embodiments relate to electronic system.

In some example embodiments, the electronic system includes a processor; and an image processing device controlled by the processor, the image processing device including, an image segmentation unit configured to divide a plurality of input images into first images and second images based on color information and depth information, the plurality of input images being sequentially captured and received by the image processing device; a stitching unit configured to generate a first panoramic image and a second panoramic image by synthesizing the first images and the second images, respectively; and a rendering unit configured to generate an output panoramic image based on the first panoramic image and the second panoramic image.

Some example embodiments relate to an image processing device.

In some example embodiments, the image processing device includes a memory configured to store input images representing a series of overlapping frames of a scene; and a processor configured to, generate a foreground panoramic image representing a foreground of the scene and a background panoramic image representing a background of the scene, and superimposing the foreground panoramic image on the background panoramic image to generate an output panoramic image.

In some example embodiments, the processor is configured to, segment the input images into foreground images and background images based on color information and depth information, stitch a plurality of the foreground images together to generate the foreground panoramic image, and stitch a plurality of the background images together to generate the background panoramic image.

In some example embodiments, the processor is configured to stitch the plurality of the foreground images together such that different slices from each of the foreground images are utilized to generate the foreground panoramic image, and stitch the plurality of the background images together such that different slices from each of the background images are utilized to generate the background panoramic image.

In some example embodiments, the processor is configured to generate the foreground panoramic image and the background panoramic image by, scaling the foreground panoramic image by a first scaling ratio to generate a scaled foreground panoramic image, scaling the background panoramic image by a second scaling ratio to generate a scaled background panoramic image, and superimposing the scaled foreground panoramic image on the scaled background panoramic image to generate the output panoramic image.

Some example embodiments relate to a digital imaging device.

In some example embodiments, the digital imaging device includes an image pickup device configured to capture the input images as the image pickup device scans the scene; and the image processing device.

In an example embodiment, the image processing device may be included in the processor.

In an example embodiment, the electronic system may further include a graphic processor. The image processing device may be included in the graphic processor.

In the image processing device according to example embodiments, the stitching operation for generating the panoramic image may be separately performed on portions in the plurality of input images that are sequentially captured. The panoramic image may be generated by combining the stitched partial images with one another. Accordingly, the panoramic effect may be efficiently represented on the panoramic image.

In addition, in the image processing device according to example embodiments, the scaling operation for generating the scaled panoramic image may be performed on portions in the panoramic image with different ratios. The scaled panoramic image may be generated by combining the scaled partial images with each other and based on only the 2D scaling operation. Accordingly, the panoramic effect and the 3D perspective effect may be efficiently represented on the scaled panoramic image in real time with a relatively small workload and low cost.

BRIEF DESCRIPTION OF THE DRAWINGS

Illustrative, non-limiting example embodiments will be more clearly understood from the following detailed description taken in conjunction with the accompanying drawings.

DETAILED DESCRIPTION OF THE EMBODIMENTS

Figure 1:
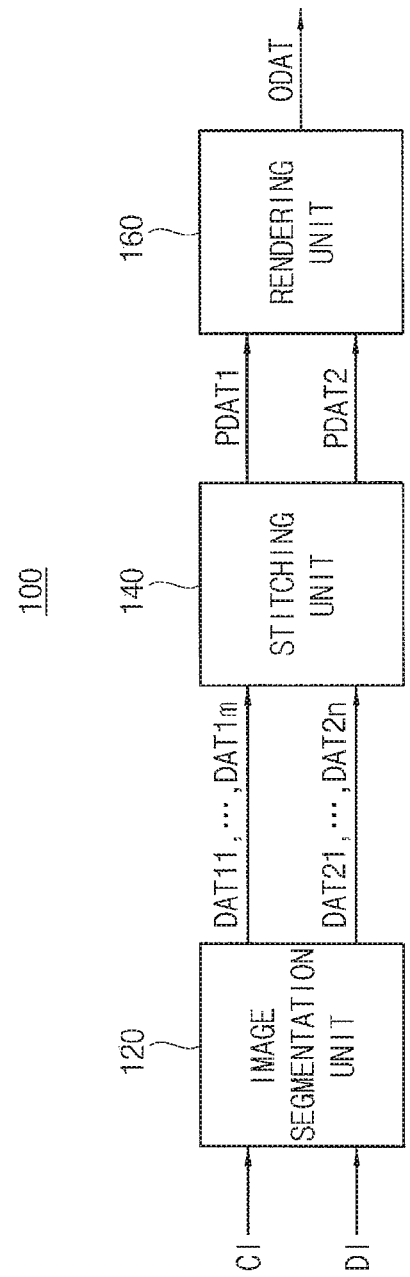
FIG. 1 is a block diagram illustrating an image processing device according to example embodiments.

Various example embodiments will be described more fully with reference to the accompanying drawings, in which embodiments are shown. The present disclosure may, however, be embodied in many different forms and should not be construed as limited to the example embodiments set forth herein. Rather, these example embodiments are provided so that this disclosure will be thorough and complete, and will fully convey the scope of the present disclosure to those skilled in the art. Like reference numerals refer to like elements throughout this application.

It will be understood that, although the terms first, second, etc. may be used herein to describe various elements, these elements should not be limited by these terms. These terms are used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware, software, and/or a combination thereof. For example, hardware devices may be implemented using processing circuity such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

FIG. 1 is a block diagram illustrating an image processing device according to example embodiments.

Referring to FIG. 1, an image processing device 100 includes a processor and a memory (described later in regards to FIG. 21).

The memory may be a non-volatile memory, a volatile memory, a hard disk, an optical disk, and a combination of two or more of the above-mentioned devices. The memory may be a non-transitory computer readable medium. The non-transitory computer-readable media may also be a distributed network, so that the program instructions are stored and executed in a distributed fashion. The non-volatile memory may be a Read Only Memory (ROM), a Programmable Read Only Memory (PROM), an Erasable Programmable Read Only Memory (EPROM), or a flash memory. The volatile memory may be a Random Access Memory (RAM).

The processor may be implemented by at least one semiconductor chip disposed on a printed circuit board. The processor may be an arithmetic logic unit, a digital signal processor, a microcomputer, a field programmable array, a programmable logic unit, a microprocessor or any other device capable of responding to and executing instructions in a defined manner. For example, in some example embodiments, the processor may be an image processor.

In some example embodiments, the processor may be programmed with instructions that configure the processor into a special purpose computer to perform the function of an image segmentation unit 120, a stitching unit 140 and a rendering unit 160.

The processor, when performing the operations of the image segmentation unit 120, may divide a plurality of input images into a plurality of first images and a plurality of second images based on color information CI and depth information DI. For example, the image segmentation unit 120 may receive the color information CI and the depth information DI for the plurality of input images from an external device (e.g., an image pickup module, an image pickup device, etc.), and may generate and output a plurality of first image data DAT11, . . . , DAT1m corresponding to the plurality of first images and a plurality of second image data DAT21, . . . , DAT2n corresponding to the plurality of second images. The color information CI may be provided as compressed data or uncompressed data.

The plurality of input images are sequentially captured by the image pickup module or the image pickup device. Each of the plurality of first images and each of the plurality of second images may be at least a portion of a respective one of the plurality of input images. For example, one of the plurality of input images may be divided into one of the plurality of first images and one of the plurality of second images, and another one of the plurality of input images may be divided into another one of the plurality of first images and another one of the plurality of second images. For another example, one input image itself may correspond to one of the plurality of first images or one of the plurality of second images.

The processor, when performing the functions of the stitching unit 140, may generate a first panoramic image by synthesizing (e.g., stitching) the plurality of first images, and generates a second panoramic image by synthesizing (e.g., stitching) the plurality of second images. For example, the stitching unit 140 may receive the plurality of first image data DAT11, . . . , DAT1m and the plurality of second image data DAT21, . . . , DAT2n from the image segmentation unit 120, and may generate and output first panoramic image data PDAT1 corresponding to the first panoramic image and second panoramic image data PDAT2 corresponding to the second panoramic image. The first panoramic image data PDAT1 and the second panoramic image data PDAT2 may be substantially simultaneously (or concurrently) generated, or may be sequentially generated.

The processor, when performing the functions of the rendering unit 160, may generate an output panoramic image based on the first panoramic image and the second panoramic image. For example, the rendering unit 160 may receive the first panoramic image data PDAT1 and the second panoramic image data PDAT2 from the stitching unit 140, and may generate output image data ODAT corresponding to the output panoramic image.

FIGS. 2A, 2B, 2C, 3A, 3B, 3C, 4A, 4B, 4C, 5A, 5B, 5C, 6, 7 and 8 are diagrams for describing an operation of the image processing device according to example embodiments.

Figure 6:
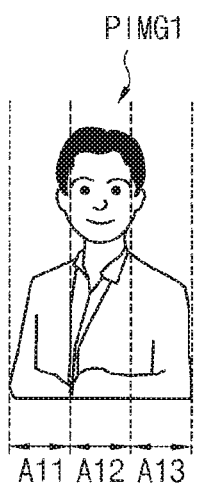
Figure 7:
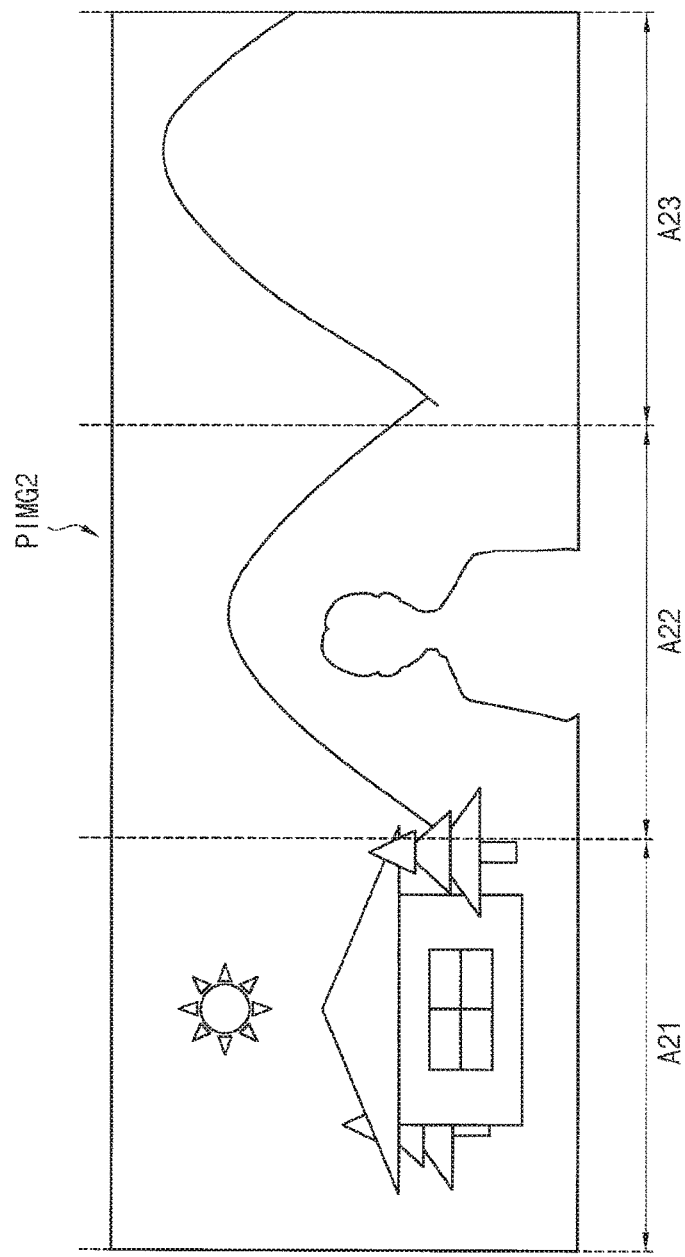
Figure 8:
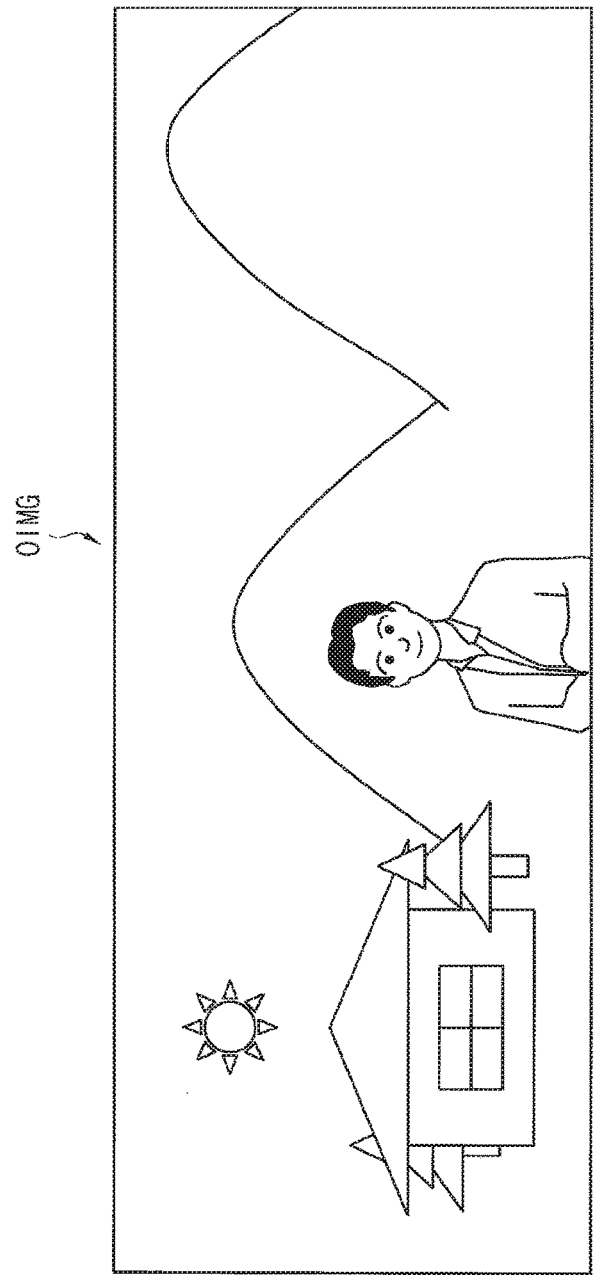

Referring to FIGS. 1 through 8, based on an image processing that will be described below, each of a plurality of input images IIMG1, IIMG2 and IIMG3 of FIGS. 2A, 2B and 2C may constitute a portion of an output panoramic image OIMG of FIG. 8. In other words, the output panoramic image OIMG may consist of the plurality of input images IIMG1~IIMG3.

The plurality of input images IIMG1~IIMG3 may be sequentially obtained by the image pickup module while a viewpoint of the image pickup module unidirectionally moves (e.g., while a camera angle moves in one direction). For example, the input images IIMG1~IIMG3 may be sequentially obtained while the viewpoint of the image pickup module moves from the left to the right. The plurality of input images IIMG1~IIMG3 may include an object (e.g., a man, a human, or a person) and a background (e.g., the sun, mountains, a house, trees, etc.).

The plurality of input images IIMG1~IIMG3 may be provided as a plurality of input image data. The color information CI may be obtained from the plurality of input image data.

The color information CI may include any type of color data. For example, the color data may have one of various image formats, such as RGB, YUV, YCbCr, YPbPr, etc.

The plurality of input image data may include color data that are substantially the same as the color information CI, or may include coding data that are generated by encoding the color information CI. For example, the coding data may be generated based on one of various coding schemes, such as JPEG (Joint Photographic Experts Group), MPEG (Moving Picture Expert Group), H.264, HEVC (High Efficiency Video Coding), etc.

In some example embodiments, when the plurality of input image data include the coding data, the image processing device 100 of FIG. 1 may further include a decoding unit (not illustrated) that generates the color information CI (e.g., RGB, YUV, YCbCr, YPbPr, etc.) by decoding the coding data.

Figure 3A:
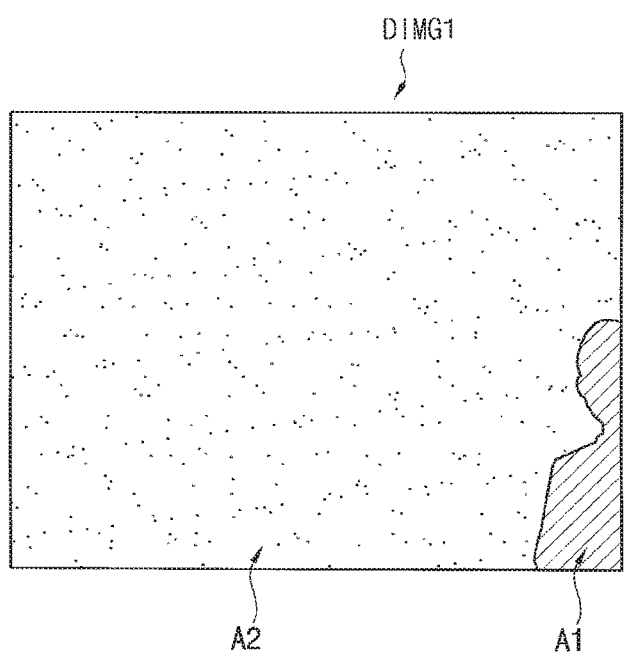
Figure 3B:
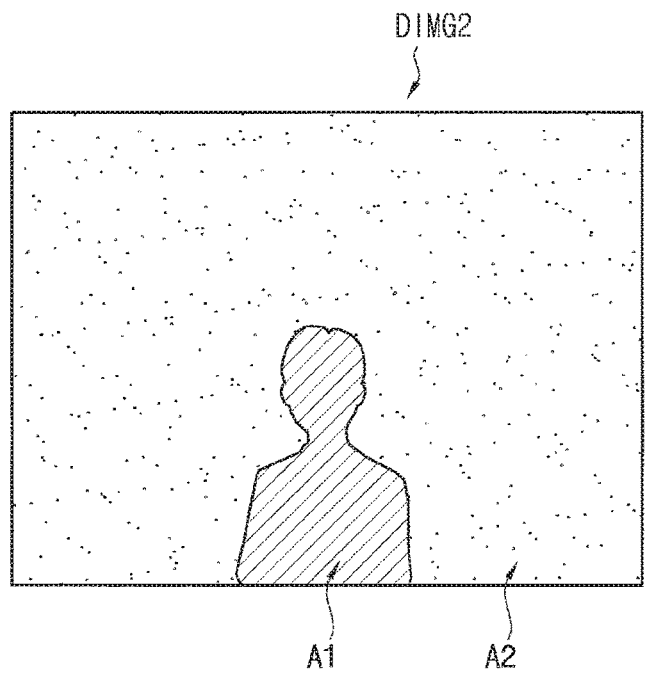
Figure 3C:
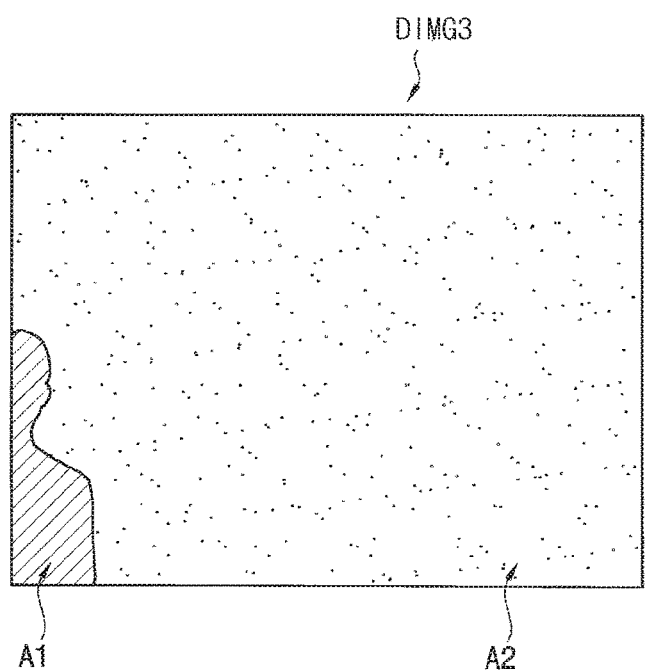

A plurality of depth images DIMG1, DIMG2 and DIMG3 of FIGS. 3A, 3B and 3C may correspond to the plurality of input images IIMG1~IIMG3, respectively. The plurality of depth images DIMG1~DIMG3 may include an object region A1 and a background region A2.

The plurality of depth images DIMG1~DIMG3 may be provided as a plurality of depth image data. The depth information DI may be obtained from the plurality of depth image data.

The depth information DI may include a plurality of depth data for distinguishing the object and the background in the plurality of input images IIMG1~IIMG3. For example, the depth information DI may include first depth data and second depth data. The first depth data may be data of the object region A1 corresponding to the object such that a distance between the image pickup module (or a distance between the object and a person who captures the images) is relatively short (e.g., is shorter than a reference distance). The second depth data may be data of the background region A2 corresponding to the background such that a distance between the background and the image pickup module is relatively long (e.g., is longer than the reference distance).

In some example embodiments, the color information CI and the depth information DI may be obtained in an initial operation time of the image processing. The color information CI and the depth information DI may be substantially simultaneously or sequentially obtained. For example, the color information CI and the depth information DI may be obtained from a single module (e.g., an image pickup module), or may be obtained from two separated modules (e.g., an image pickup module and a depth measurement module), respectively.

In some example embodiments, the color information CI and the depth information DI may be stored in a non-volatile memory (not illustrated), and may be loaded from the non-volatile memory into a volatile memory of the processor at in the initial operation time of the image processing.

Figure 4A:
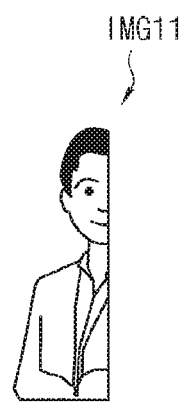
Figure 4B:
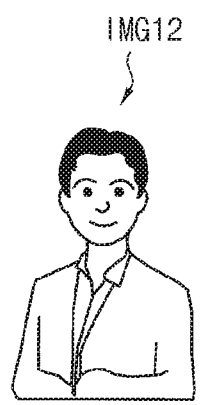
Figure 4C:
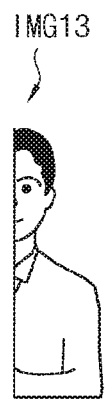
Figure 5A:
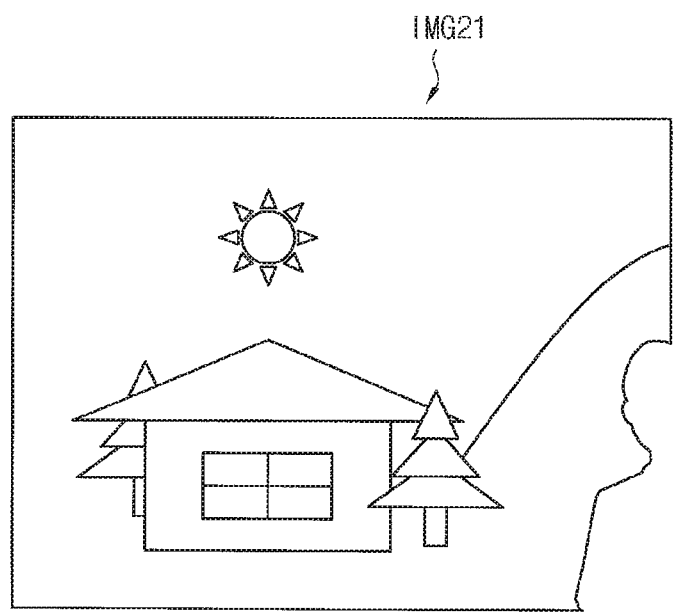
Figure 5B:
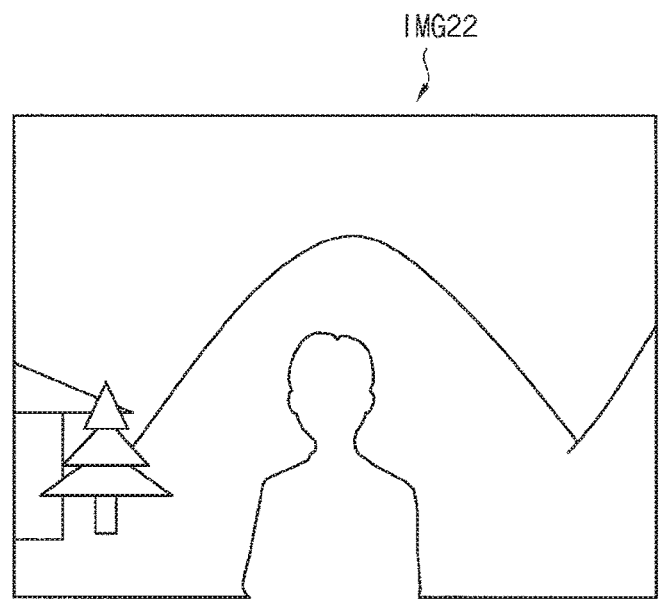
Figure 5C:
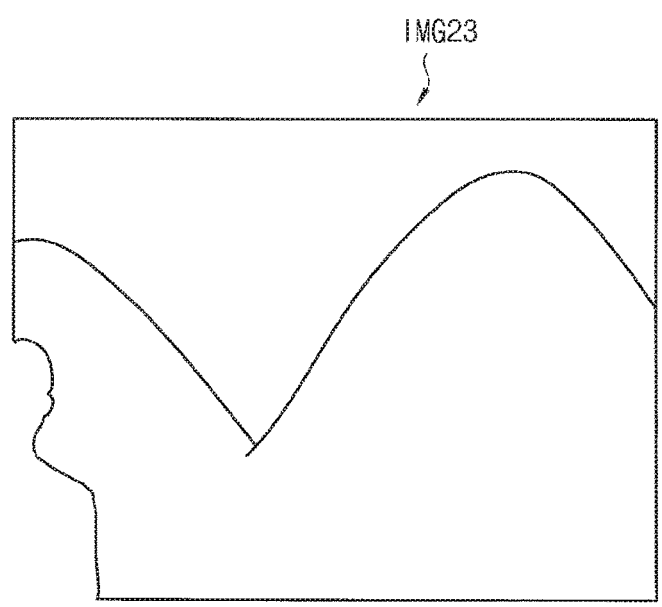

The image segmentation unit 120 may divide the plurality of input images IIMG1~IIMG3 into a plurality of first images IMG11, IMG12 and IMG13 of FIGS. 4A, 4B and 4C and a plurality of second images IMG21, IMG22 and IMG23 of FIGS. 5A, 5B and 5C based on the color information CI and the depth information DI. For example, the input image IIMG1 may be divided into the images IMG11 and IMG21, the input image IIMG2 may be divided into the images IMG12 and IMG22, and the input image IIMG3 may be divided into the images IMG13 and IMG23.

The plurality of first images IMG11~IMG13 may be included in the plurality of input images IIMG1~IIMG3, and may be images of the object region A1 corresponding to the object. The plurality of second images IMG21~IMG23 may be included in the plurality of input images IIMG1~IIMG3, and may be images of the background region A2 corresponding to the background. In other words, the plurality of first images IMG11~IMG13 may be associated with the object in the plurality of input images IIMG1~IIMG3, and the plurality of second images IMG21~IMG23 may be associated with the background other than the object in the plurality of input images IIMG1~IIMG3.

The stitching unit 140 may generate a first panoramic image PIMG1 of FIG. 6 by synthesizing the plurality of first images IMG11~IMG13, and may generate a second panoramic image PIMG2 of FIG. 7 by synthesizing the plurality of second images IMG21~IMG23.

In some example embodiments, the stitching unit 140 may perform a stitching operation such that portions of the first panoramic image PIMG1 are extracted from the plurality of first images IMG11~IMG13 and the extracted portions of the first panoramic image PIMG1 are combined with one another. For example, as illustrated in FIGS. 4A, 4B, 4C and 6, when the first panoramic image PIMG1 is generated based on three images IMG11~IMG13, a first portion (e.g., the left region) A11 of the first panoramic image PIMG1 may be extracted from the image IMG11, a second portion (e.g., the middle region) A12 of the first panoramic image PIMG1 may be extracted from the image IMG12, and a third portion (e.g., the right region) A13 of the first panoramic image PIMG1 may be extracted from the image IMG13. The first panoramic image PIMG1 may be generated by combining the first, second and third portions A11, A12 and A13 with one another.

In addition, the stitching unit 140 may perform the stitching operation such that portions (e.g., A21, A22 and A23 in FIG. 7) of the second panoramic image PIMG2 are extracted from the plurality of second images IMG21~IMG23 and the extracted portions of the second panoramic image PIMG2 are combined with one another.

The rendering unit 160 may generate the output panoramic image OIMG based on the first panoramic image PIMG1 and the second panoramic image PIMG2. For example, the output panoramic image OIMG may be generated by combining (e.g., overlapping) the first panoramic image PIMG1 with the second panoramic image PIMG2. For example, the first panoramic image PIMG1 may be inserted into an empty region in the second panoramic image PIMG2 to remove the empty region in the second panoramic image PIMG2.

In the image processing device 100 according to example embodiments, the stitching operation for generating the panoramic image OIMG may be separately performed on portions in the plurality of input images IIMG1~IIMG3 that are sequentially captured. For example, the stitching operation may be performed on partial images for the object, and the stitching operation may be performed on partial images for the background, independently of the partial images for the object. The panoramic image OIMG may be generated by combining the stitched partial images with one another. Accordingly, the image processing device 100 may effectively generate the panoramic image OIMG, and a panoramic effect may be efficiently represented on the panoramic image OIMG.

Although the example embodiments are described based on an example (e.g., an example illustrated in FIGS. 2A through 8) where each of the number of the first images IMG11~IMG13 and the number of the second images IMG21~IMG23 are substantially the same as the number of the input images IIMG1~IIMG3, the example embodiments will be employed to an example where at least one of the number of the first images and the number of the second images are different from the number of the input images. For example, n input images may be divided into m first images (e.g., partial images for the object) and n second images (e.g., partial images for the background), where n is a natural number and m is a natural number equal to or smaller than n. In other words, the number of the first images may be equal to or smaller than the number of the input images, and the number of the second images may be equal to the number of the input images. In this example, some of the input images may not be physically divided and may be substantially the same as some of the second images, respectively.

Figure 9:
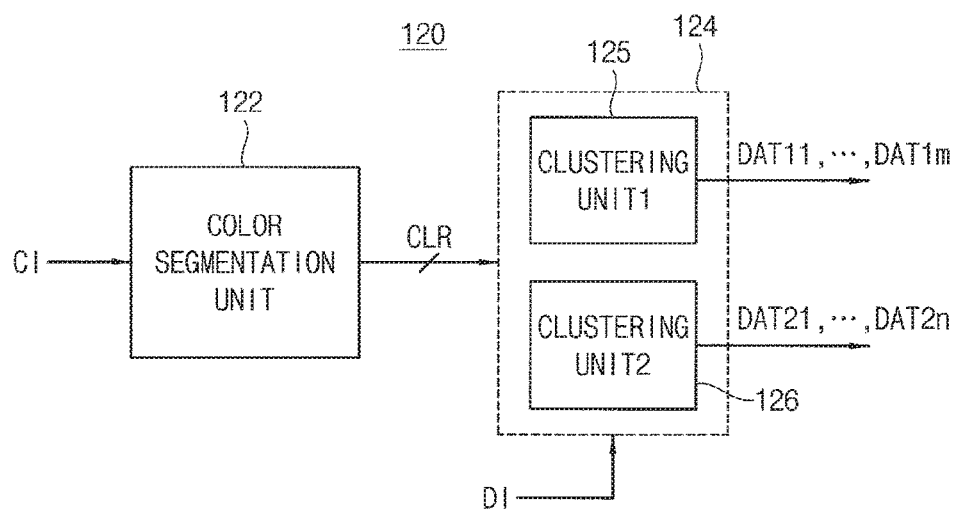
FIG. 9 is a block diagram illustrating an example of an image segmentation unit included in the image processing device of FIG. 1.

FIG. 9 is a block diagram illustrating an example of an image segmentation unit included in the image processing device of FIG. 1.

Referring to FIG. 9, the processor, when performing the operations of the image segmentation unit 120, may more specifically perform the operations of a color segmentation unit 122 and a clustering unit 124.

The color segmentation unit 122 may generate a plurality of color data CLR by performing a color classification on the plurality of input images (e.g., IIMG1~IIMG3 of FIGS. 2A, 2B and 2C) based on the color information CI. The color classification may indicate an operation in which each of the plurality of input images is divided into a plurality of image blocks and/or an operation in which image blocks having the same color (or similar color) are checked. Each of the plurality of image blocks may include at least two pixels (e.g., 2*2 or 3*3 pixels).

The clustering unit 124 may generate the plurality of first image data DAT11, ..., DAT1m and the plurality of second image data DAT21, ..., DAT2n based on the plurality of color data CLR and the depth information DI. The plurality of first image data DAT11, ..., DAT1m may correspond to the plurality of first images (e.g., IMG11~IMG13 of FIGS. 4A, 4B and 4C). The plurality of second image data DAT21, ..., DAT2n may correspond to the plurality of second images (e.g., IMG21~IMG23 of FIGS. 5A, 5B and 5C).

The clustering unit 124 may include a first clustering unit 125 that generates the plurality of first image data DAT11, ..., DAT1m and a second clustering unit 126 that generates the plurality of second image data DAT21, ..., DAT2n.

Similar to the color information CI, each of the plurality of first image data DAT11, ..., DAT1m and the plurality of second image data DAT21, ..., DAT2n may include any type of color data. Each of the first image data DAT11, ..., DAT1m and the second image data DAT21, ..., DAT2n may further include an alpha value. The alpha value may indicate whether each image data corresponds to the first images or the second images. For example, a plurality of first pixel data in the plurality of first image data DAT11, ..., DAT1m may have a first alpha value, and a plurality of second pixel data in the plurality of second image data DAT21, ..., DAT2n may have a second alpha value. Each of the first image data DAT11, ..., DAT1m and the second image data DAT21, ..., DAT2n may further include information indicating positions of the first images and the second images.

Figure 10:
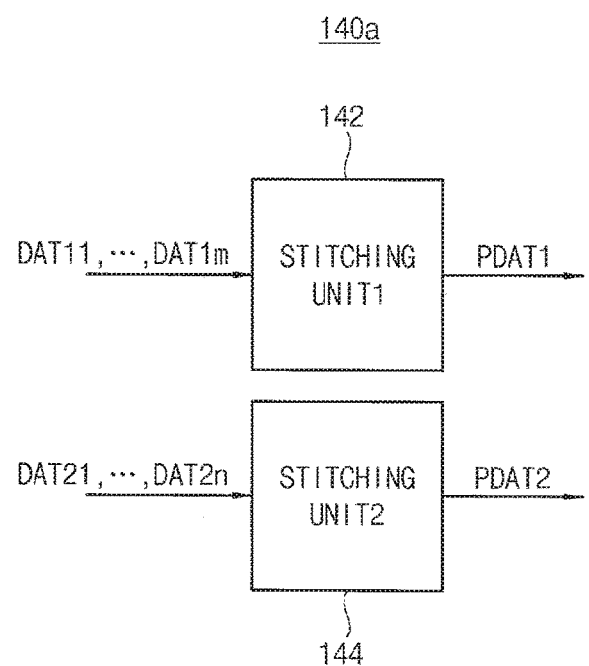
FIGS. 10 and 11 are block diagrams illustrating examples of a stitching unit included in the image processing device of FIG. 1.
Figure 11:
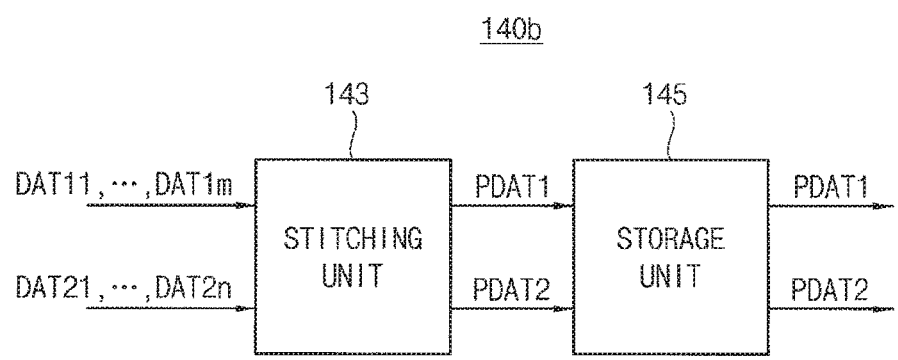

FIGS. 10 and 11 are block diagrams illustrating examples of a stitching unit included in the image processing device of FIG. 1.

Referring to FIG. 10, in some example embodiments, the processor, when performing the operations of the stitching unit 140, the processor may perform as a stitching unit 140a. For example, the stitching unit 140a may include a first stitching unit 142 and a second stitching unit 144.

The first stitching unit 142 may generate the first panoramic image data PDAT1 corresponding to the first panoramic image (e.g., PIMG1 of FIG. 6) based on the plurality of first image data DAT11, ..., DAT1m. The second stitching unit 144 may generate the second panoramic image data PDAT2 corresponding to the second panoramic image (e.g., PIMG2 of FIG. 7) based on the plurality of second image data DAT21, ..., DAT2n. For example, the first panoramic image data PDAT1 and the second panoramic image data PDAT2 may be substantially simultaneously generated.

The stitching operation may be separately and independently performed on the first images (e.g., based on the first image data DAT11, ..., DAT1m) and the second images (e.g., based on the second image data DAT21, ..., DAT2n), by the first and second stitching units 142 and 144.

Similar to the first image data DAT11, ..., DAT1m and the second image data DAT21, ..., DAT2n, each of the first panoramic image data PDAT1 and the second panoramic image data PDAT2 may include any type of color data, and may further include at least one of an alpha value and position information.

Referring to FIG. 11, in some example embodiments, the processor, when performing the operations of the stitching unit 140, the processor may perform as a stitching unit 140b. For example, the stitching unit 140b may include a first stitching unit 143 and a storage unit 145.

The first stitching unit 143 may generate the first panoramic image data PDAT1 based on the plurality of first image data DAT11, ..., DAT1m, and may generate the second panoramic image data PDAT2 based on the plurality of second image data DAT21, ..., DAT2n. For example, the first panoramic image data PDAT1 and the second panoramic image data PDAT2 may be sequentially generated.

The stitching operation may be separately and independently performed on the first images (e.g., based on the first image data DAT11, ..., DAT1m) and the second images (e.g., based on the second image data DAT21, ..., DAT2n), by the first stitching unit 143.

The storage unit 145 may sequentially store the first panoramic image data PDAT1 and the second panoramic image data PDAT2, and may substantially simultaneously output the first panoramic image data PDAT1 and the second panoramic image data PDAT2.

In some example embodiments, the storage unit 145 may include at least one volatile memory, such as a dynamic random access memory (DRAM), a static random access memory (SRAM), and/or at least one nonvolatile memory, such as an electrically erasable programmable read-only memory (EEPROM), a flash memory, a phase change random access memory (PRAM), a resistance random access memory (RRAM), a magnetic random access memory (MRAM), a ferroelectric random access memory (FRAM), a nano floating gate memory (NFGM), or a polymer random access memory (PoRAM).

Although not illustrated in FIG. 11, the storage unit 145 may be located outside the stitching unit 140*b*. For example, the storage unit may be located inside the rendering unit 160 in FIG. 1, or may be located in any position in the image processing device 100 of FIG. 1.

Figure 12:
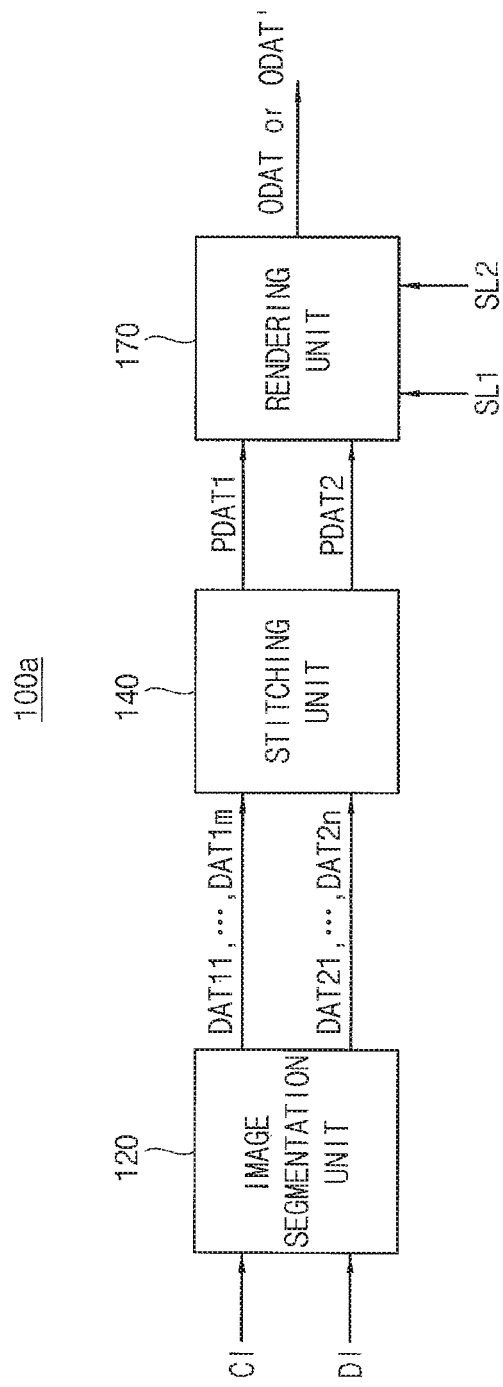
FIG. 12 is a block diagram illustrating an image processing device according to example embodiments.

FIG. 12 is a block diagram illustrating an image processing device according to example embodiments.

Referring to FIG. 12, an image processing device 100*a* includes a processor and a memory (described later in regards to FIG. 21).

The memory may be a non-volatile memory, a volatile memory, a hard disk, an optical disk, and a combination of two or more of the above-mentioned devices. The memory may be a non-transitory computer readable medium. The non-transitory computer-readable media may also be a distributed network, so that the program instructions are stored and executed in a distributed fashion. The non-volatile memory may be a Read Only Memory (ROM), a Programmable Read Only Memory (PROM), an Erasable Programmable Read Only Memory (EPROM), or a flash memory. The volatile memory may be a Random Access Memory (RAM).

The processor may be implemented by at least one semiconductor chip disposed on a printed circuit board. The processor may be an arithmetic logic unit, a digital signal processor, a microcomputer, a field programmable array, a programmable logic unit, a microprocessor or any other device capable of responding to and executing instructions in a defined manner. For example, in some example embodiments, the processor may be an image processer.

In some example embodiments, the processor may be programmed with instructions that configure the processor into a special purpose computer to perform the function of an image segmentation unit 120, a stitching unit 140 and a rendering unit 170.

The image processing device 100*a* of FIG. 12 may be substantially the same as the image processing device 100 of FIG. 1, except that an operation and a configuration of the rendering unit 170 in FIG. 12 are different from those of the rendering unit 160 in FIG. 1.

The rendering unit 170 may operate in two different operation modes, that is, a first operation mode and a second operation mode.

In the first operation mode, the rendering unit 170 may generate the output panoramic image by combining the first panoramic image with the second panoramic image without scaling (e.g., without a change of sizes of the first and second panoramic images), and may generate output image data ODAT corresponding to the output panoramic image.

In the second operation mode, the rendering unit 170 may scale the first and second panoramic images with different ratios based on a first scaling value SL1 and a second scaling value SL2, may generate the output panoramic image by combining the scaled first panoramic image with the scaled second panoramic image, and may generate output image data ODAT' corresponding to the output panoramic image. The second scaling value SL2 may be different from the first scaling value SL1.

In some example embodiments, the first scaling value SL1 for the first panoramic image and the second scaling value SL2 for the second panoramic image may be determined based on the depth information DI or by a user.

An operation of the rendering unit 170 in the first operation mode (e.g., an operation of generating the output panoramic image without scaling of the first and second panoramic images) may be substantially the same as the operation of the rendering unit 160 that is described above with reference to FIGS. 1 through 8. The output image data ODAT in FIG. 12 may be substantially the same as the output image data ODAT in FIG. 1, and may correspond to the output panoramic image OIMG of FIG. 8.

Hereinafter, an operation of the rendering unit 170 in the second operation mode (e.g., an operation of generating the output panoramic image by scaling the first and second panoramic images with the different ratios and by combining the scaled first panoramic image with the scaled second panoramic image) will be explained in detail.

Figure 13:
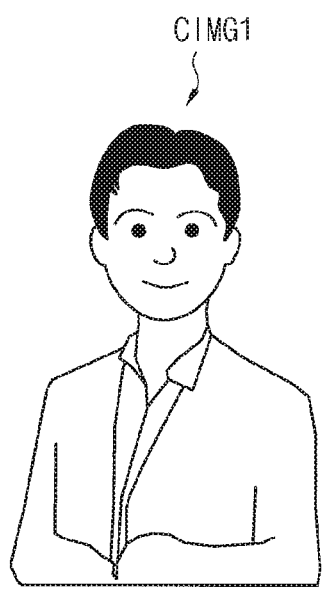
FIGS. 13, 14 and 15 are diagrams for describing an operation of the image processing device according to example embodiments.
Figure 14:
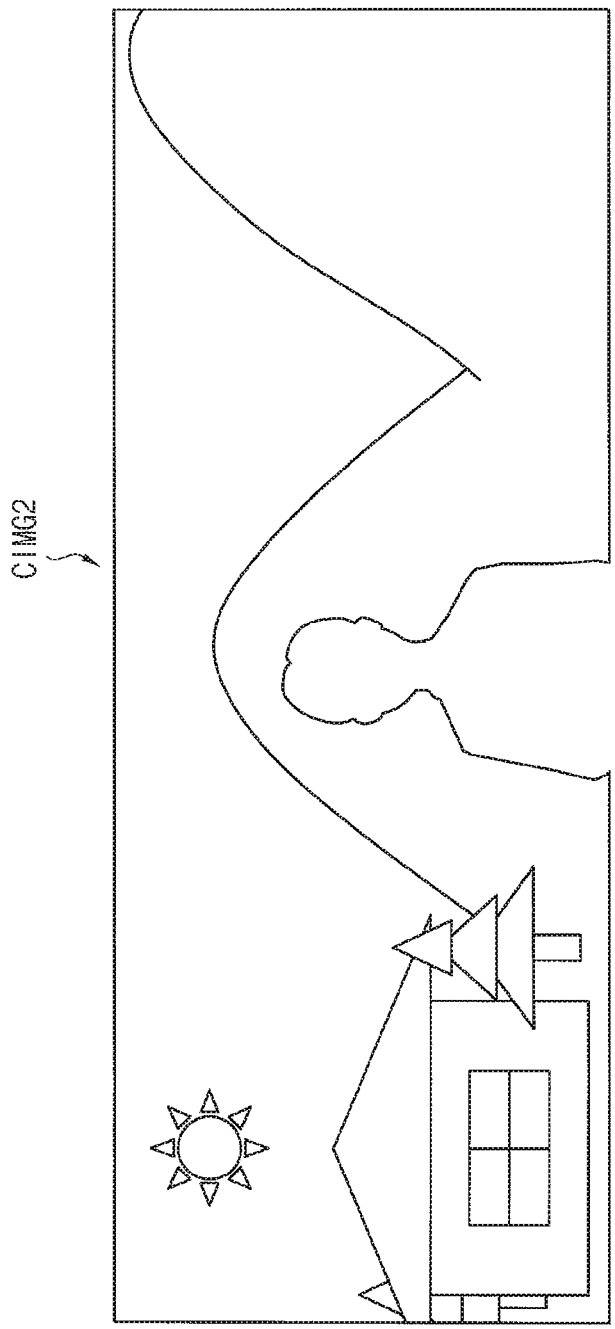
Figure 15:
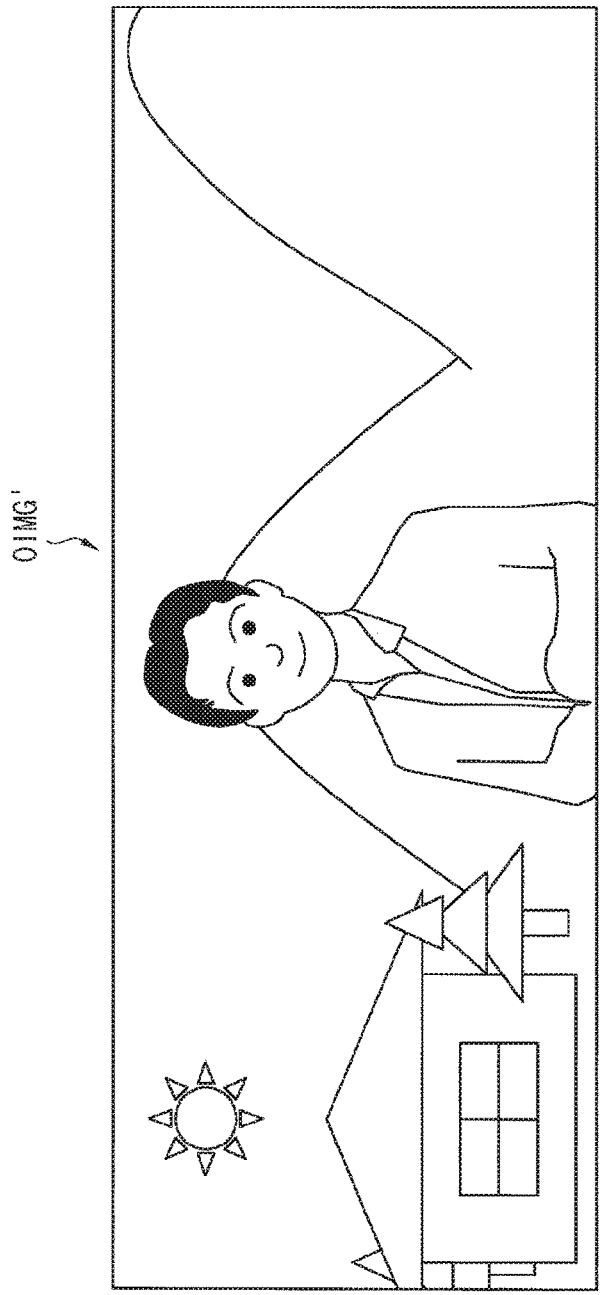

FIGS. 13, 14 and 15 are diagrams for describing an operation of the image processing device according to example embodiments.

Figure 2A:
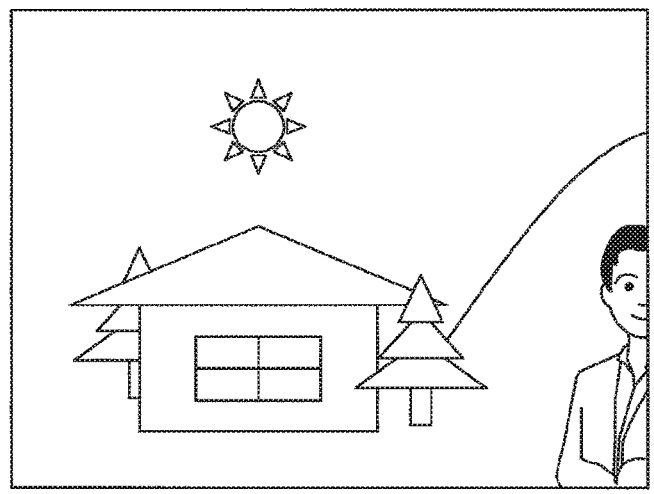
FIGS. 2A, 2B, 2C, 3A, 3B, 3C, 4A, 4B, 4C, 5A, 5B, 5C, 6, 7 and 8 are diagrams for describing an operation of the image processing device according to example embodiments.
Figure 2B:
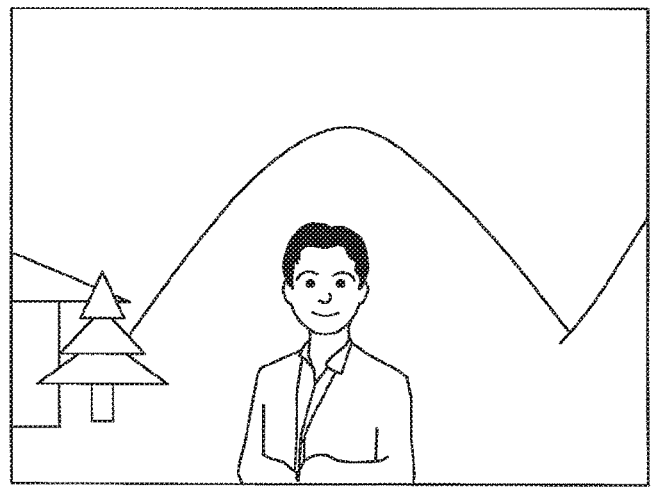
Figure 2C:
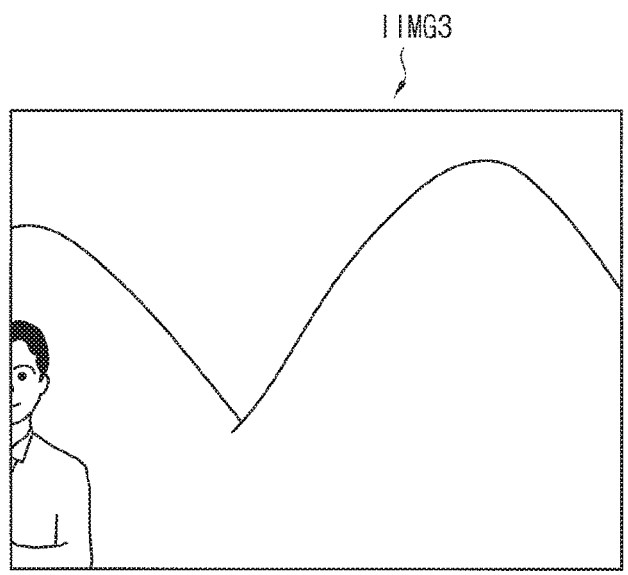

Referring to FIGS. 2A through 8 and FIGS. 12 through 15, the processor, when performing the functions of the image segmentation unit 120, may divide the plurality of input images IIMG1~IIMG3 of FIGS. 2A, 2B and 2C into the plurality of first images IMG11~IMG13 of FIGS. 4A, 4B and 4C and a plurality of second images IMG21~IMG23 of FIGS. 5A, 5B and 5C based on the color information CI and the depth information DI.

The processor, when performing the functions of the stitching unit 140, may generate the first panoramic image PIMG1 of FIG. 6 by synthesizing the plurality of first images IMG11~IMG13, and may generate the second panoramic image PIMG2 of FIG. 7 by synthesizing the plurality of second images IMG21~IMG23.

The processor, when performing the functions of the rendering unit 170, may scale the first panoramic image PIMG1 based on the first scaling value SL1, and may scale the second panoramic image PIMG2 based on the second scaling value SL2. In other words, the rendering unit 170 may change a size of the first panoramic image PIMG1 based on the first scaling value SL1, and may change a size of the second panoramic image PIMG2 based on the second scaling value SL2.

In some example embodiments, the rendering unit 170 may perform an up-scaling in which the first and second panoramic images PIMG1 and PIMG2 are enlarged. For example, the rendering unit 170 may generate a first conversion image CIMG1 of FIG. 13 by magnifying the first panoramic image PIMG1 based on the first scaling value SL1, and may generate a second conversion image CIMG2 of FIG. 14 by magnifying the second panoramic image PIMG2 based on the second scaling value SL2. In other words, the first conversion image CIMG1 may be an enlarged image of the first panoramic image PIMG1, and the second conversion image CIMG2 may be a an enlarged image of the second panoramic image PIMG2.

In some example embodiments, to display the second panoramic image PIMG2 and the second conversion image CIMG2 on a screen (or a display panel, a display device, etc.) of the same size, the second conversion image CIMG2 may be obtained by cutting off (or by truncating) edge regions of the magnified second panoramic image PIMG2. The rendering unit 170 and/or an image cutting unit (not illustrated) in the image processing device 100a may perform the operation of cutting off the edge regions of the magnified second panoramic image PIMG2.

When the first panoramic image PIMG1 and the first conversion image CIMG1 are sequentially displayed on the screen, or when the second panoramic image PIMG2 and the second conversion image CIMG2 are sequentially displayed on the screen, the user can recognize an effect where the object and/or the background become closer to the user's eyes. The operation of sequentially displaying an original image and an enlarged image may be referred to as a zoom-in or a zoom-up.

In some example embodiments, when the zoom-in is performed, the first scaling value SL1 may be greater than the second scaling value SL2. In the zoom-in, the first scaling value SL1 may indicate a magnification factor for the first panoramic image PIMG1, and the second scaling value SL2 may indicate a magnification factor for the second panoramic image PIMG2. For example, in an example of FIGS. 6, 7, 13 and 14, the first scaling value SL1 may be about 2, and the second scaling value SL2 may be about 1.2. In other words, a size of the first conversion image CIMG1 may be about twice larger than the size of the first panoramic image PIMG1, and the second conversion image CIMG2 may be magnified to about 1.2 times from the second panoramic image PIMG2.

The rendering unit 170 may generate the output panoramic image OIMG' of FIG. 15 based on the first conversion image CIMG1 and the second conversion image CIMG2. For example, the output panoramic image OIMG' may be generated by combining (e.g., overlapping) the first conversion image CIMG1 with the second conversion image CIMG2. The rendering unit 170 may generate the output image data ODAT' corresponding to the output panoramic image OIMG'.

In some example embodiments, to remove an empty region in the second conversion image CIMG2, the output panoramic image OIMG' may be generated by superimposing the first conversion image CIMG1 onto the second conversion image CIMG2. In other words, the enlarged object may be superimposed onto the enlarged background.

The output panoramic image OIMG' of FIG. 15 may be an enlarged image of the output panoramic image OIMG of FIG. 8. In other words, the output panoramic image OIMG' may be obtained by performing the zoom-in on the output panoramic image OIMG. The output panoramic image OIMG' may be generated based on the output panoramic image OIMG by relatively large-scaling the first panoramic image PIMG1 and by relatively small-scaling the second panoramic image PIMG2 (e.g., by determining a magnification factor for the object greater than a magnification factor for the background). Thus, a three-dimensional (3D) perspective effect may be represented between the object and the background in the output panoramic image OIMG'.

In the image processing device 100a according to example embodiments, the stitching operation for generating the panoramic image OIMG may be separately performed on portions in the plurality of input images IIMG1~IIMG3. In addition, a scaling operation for generating the scaled panoramic image OIMG' may be performed on portions in the panoramic image OIMG with different ratios. For example, the scaling operation may be performed on a partial image for the object based on a first ratio, and the scaling operation may be performed on a partial image for the background based on a second ratio different from the first ratio. The scaled panoramic image OIMG' may be generated by combining the scaled partial images with each other. Accordingly, the image processing device 100a may effectively generate the scaled panoramic image OIMG', and the panoramic effect and the 3D perspective effect may be efficiently represented on the scaled panoramic image OIMG'. In other words, the image processing device 100a may generate the scaled panoramic image OIMG' based on only a two-dimensional (2D) image processing (e.g., a 2D scaling operation) without a 3D coordinate calculation, and thus the 3D perspective effect may be represented in real time with a relatively small calculation and resource (e.g., with a relatively small workload and low cost).

Although the example embodiments are described based on an example (e.g., an example illustrated in FIGS. 6 through 8 and FIGS. 13 through 15) where the zoom-in is performed on the panoramic image OIMG (e.g., the panoramic image OIMG is enlarged), the example embodiments will be employed to an example where a zoom-out or a zoom-back is performed on the panoramic image OIMG (e.g., the panoramic image OIMG is reduced). Unlike the zoom-in, the user can recognize an effect where the object and/or the background become farther away from the user's eyes when the zoom-out is performed. Although not illustrated in FIGS. 13 through 15, the zoom-out will be explained in detail.

In some example embodiments, the rendering unit 170 may perform a down-scaling in which the first and second panoramic images PIMG1 and PIMG2 are reduced. For example, the rendering unit 170 may generate a third conversion image by demagnifying the first panoramic image PIMG1 based on the first scaling value SL1, and may generate a fourth conversion image by demagnifying the second panoramic image PIMG2 based on the second scaling value SL2. To display the second panoramic image PIMG2 and the fourth conversion image on the screen of the same size, the fourth conversion image may be obtained by performing an additional image processing for the demagnified second panoramic image PIMG2. For example, a portion (e.g., edge regions) of the demagnified second panoramic image PIMG2 may be copied, and the copied portion may be pasted to the demagnified second panoramic image PIMG2. The rendering unit 170 and/or an image reconfiguration unit (not illustrated) in the image processing device 100a may perform the additional image processing for the demagnified second panoramic image PIMG2. When the zoom-out is performed, the first scaling value SL1 may be smaller than the second scaling value SL2. In the zoom-out, the first scaling value SL1 may indicate a demagnification factor for the first panoramic image PIMG1, and the second scaling value SL2 may indicate a demagnification factor for the second panoramic image PIMG2. For example, the first scaling value SL1 may be about 0.5, and the second scaling value SL2 may be about 0.8. In other words, a size of the third conversion image may be about a half of the size of the first panoramic image PIMG1, and the fourth conversion image may be demagnified to about 0.8 times from the second panoramic image PIMG2.

Figure 16:
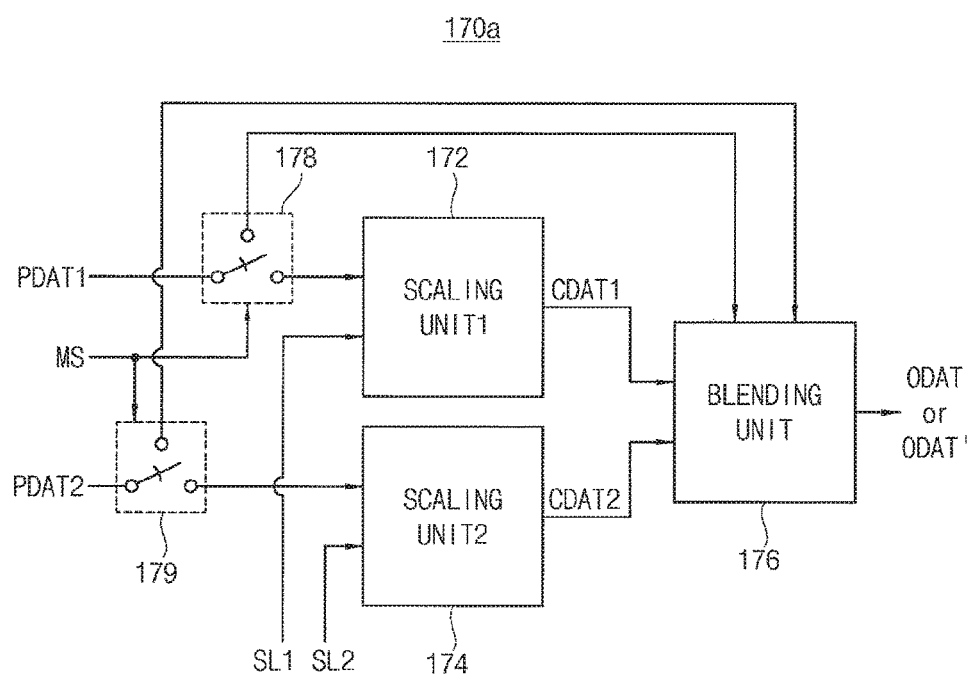
FIGS. 16 and 17 are block diagrams illustrating examples of a rendering unit included in the image processing device of FIG. 12.
Figure 17:
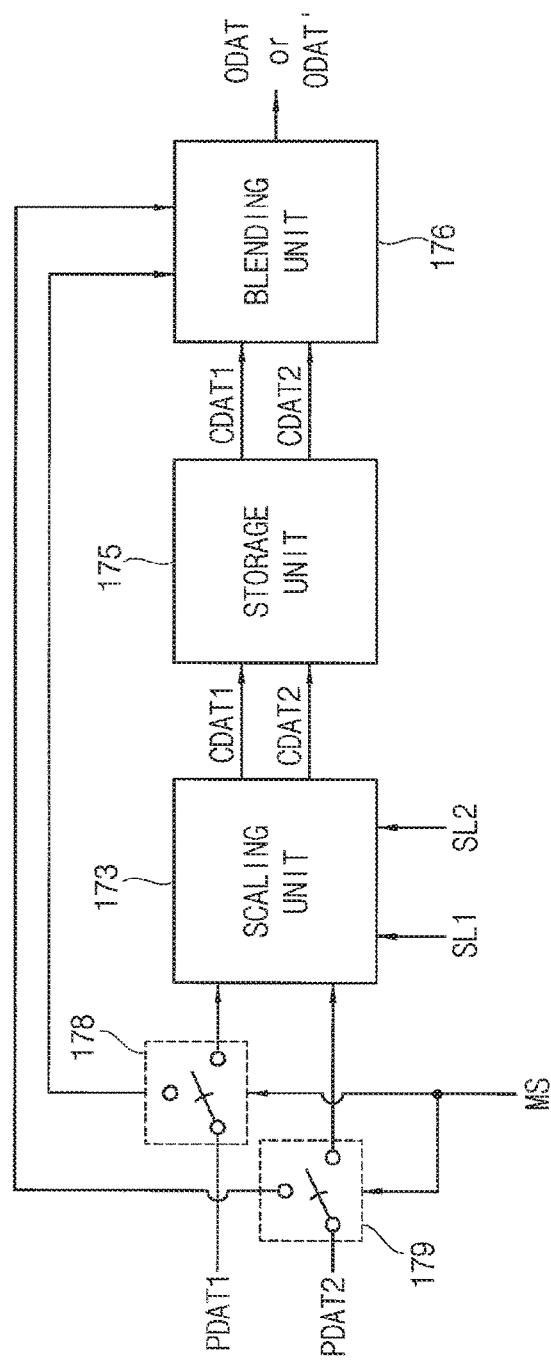

FIGS. 16 and 17 are block diagrams illustrating examples of a rendering unit included in the image processing device of FIG. 12.

Referring to FIG. 16, when performing the operations of the rendering unit 170, the processor may act as a rendering unit 170a. The rendering unit 170a may include a first scaling unit 172, a second scaling unit 174 and a blending unit 176. The rendering unit 170a may further include a mode selection unit 178 and 179.

The first scaling unit 172 may generate the first conversion image (e.g., CIMG1 of FIG. 13) by resizing the first panoramic image (e.g., PIMG1 of FIG. 6) based on the first scaling value SL1. The first scaling unit 172 may receive the first panoramic image data PDAT1 corresponding to the first panoramic image from the stitching unit 140 in FIG. 12, and may generate and output first conversion image data CDAT1 corresponding to the first conversion image.

The second scaling unit 174 may generate the second conversion image (e.g., CIMG2 of FIG. 14) by resizing the second panoramic image (e.g., PIMG2 of FIG. 7) based on the second scaling value SL2. The second scaling unit 174 may receive the second panoramic image data PDAT2 corresponding to the second panoramic image from the stitching unit 140 in FIG. 12, and may generate and output second conversion image data CDAT2 corresponding to the second conversion image. For example, the first conversion image data CDAT1 and the second conversion image data CDAT2 may be substantially simultaneously generated.

In the zoom-in, the up-scaling may be performed on the first conversion image (e.g., based on the first panoramic image data PDAT1 and the first scaling value SL1) and the second conversion image (e.g., based on the second panoramic image data PDAT2 and the second scaling value SL2) with different ratios, by the first and second scaling units 172 and 174. In the zoom-out, the down-scaling may be performed on the first conversion image and the second conversion image with different ratios, by the first and second scaling units 172 and 174.

Similar to the first panoramic image data PDAT1 and the second panoramic image data PDAT2, each of the first conversion image data CDAT1 and the second conversion image data CDAT2 may include any type of color data, and may further include at least one of an alpha value and position information.

The blending unit 176 may generate the output panoramic image (e.g., OIMG of FIG. 8) by combining the first panoramic image with the second panoramic image, or may generate the output panoramic image (e.g., OIMG' of FIG. 15) by combining the first conversion image with the second conversion image. In the first operation mode, the blending unit 176 may receive the first and second panoramic image data PDAT1 and PDAT2 from the stitching unit 140 in FIG. 12, and may generate the output image data ODAT based on the first and second panoramic image data PDAT1 and PDAT2. In the second operation mode, the blending unit 176 may receive the first and second conversion image data CDAT1 and CDAT2 from the first and second scaling units 172 and 174, and may generate the output image data ODAT' based on the first and second conversion image data CDAT1 and CDAT2.

The mode selection unit 178 and 179 may select images that are combined by the blending unit 176 based on a mode selection signal MS. For example, when the mode selection signal MS has a first logic level (e.g., a logic low level), the mode selection unit 178 and 179 may provide the first and second panoramic image data PDAT1 and PDAT2 to the blending unit 176, and the blending unit 176 may generate the output image data ODAT by combining the first panoramic image data PDAT1 with the second panoramic image data PDAT2. When the mode selection signal MS has a second logic level (e.g., a logic high level), the mode selection unit 178 and 179 may provide the first and second conversion image data CDAT1 and CDAT2 to the first and second scaling units 172 and 174, and the blending unit 176 may generate the output image data ODAT' by combining the first conversion image data CDAT1 with the second conversion image data CDAT2 that are generated from the first and second scaling units 172 and 174. For example, the mode selection unit 178 and 179 may include two switches.

Referring to FIG. 17, a rendering unit 170b may include a first scaling unit 173, a storage unit 175 and a blending unit 176. The rendering unit 170b may further include a mode selection unit 178 and 179.

The rendering unit 170b of FIG. 17 may be substantially the same as the rendering unit 170a of FIG. 16, except that two scaling units 172 and 174 in FIG. 16 are replaced by one scaling unit 173 and one storage unit 175.

The first scaling unit 173 may generate the first conversion image by resizing the first panoramic image based on the first scaling value SL1, and may generate the second conversion image by resizing the second panoramic image based on the second scaling value SL2. For example, the first and second conversion image data CDAT1 and CDAT2 corresponding to the first and second conversion images may be sequentially generated.

In the zoom-in, the up-scaling may be sequentially performed on the first conversion image (e.g., based on the first panoramic image data PDAT1 and the first scaling value SL1) and the second conversion image (e.g., based on the second panoramic image data PDAT2 and the second scaling value SL2) with different ratios, by the first scaling unit 173. In the zoom-out, the down-scaling may be sequentially performed on the first conversion image and the second conversion image with different ratios, by the first scaling unit 173.

The storage unit 175 may sequentially store the first and second conversion image data CDAT1 and CDAT2, and may substantially simultaneously output the first and second conversion image data CDAT1 and CDAT2. For example, the storage unit 175 may include at least one volatile memory and/or at least one nonvolatile memory. Although not illustrated in FIG. 17, the storage unit 175 may be located outside the rendering unit 170b.

Figure 18:
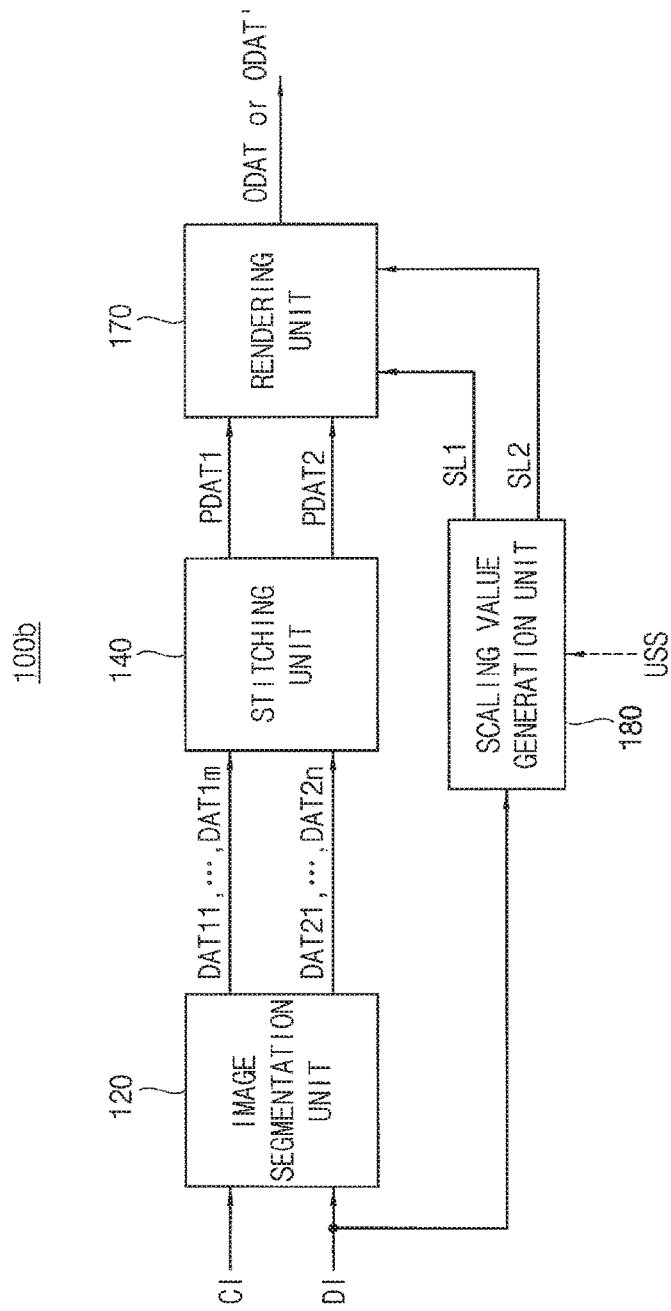
FIGS. 18 and 19 are block diagrams illustrating an image processing device according to example embodiments.
Figure 19:
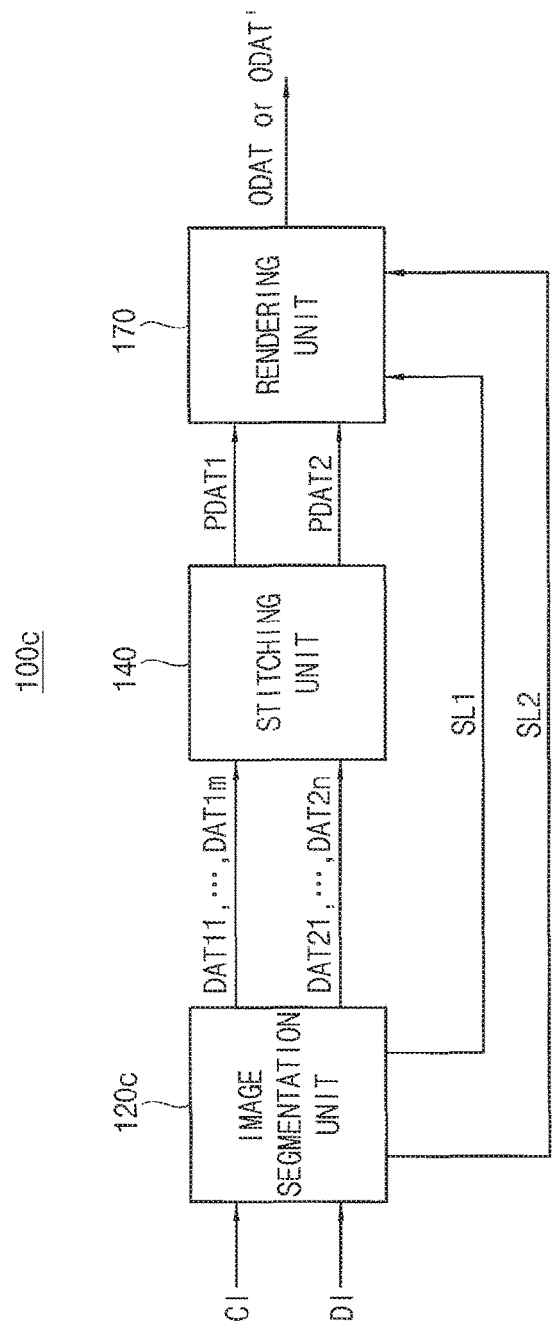

FIGS. 18 and 19 are block diagrams illustrating an image processing device according to example embodiments.

Referring to FIG. 18, an image processing device 100b includes a processor and a memory (described later in regards to FIG. 21).

In some example embodiments, the processor may be programmed with instructions that configure the processor into a special purpose computer to perform the function of the image segmentation unit 120, the stitching unit 140, the rendering unit 170 and a scaling value generation unit 180.

The image processing device 100b of FIG. 18 may be substantially the same as the image processing device 100a of FIG. 12, except that the image processing device 100b further includes the scaling value generation unit 180.

The scaling value generation unit 180 may determine the first scaling value SL1 for the first panoramic image and the second scaling value SL2 for the second panoramic image based on the depth information DI.

In some example embodiments, the first and second scaling values SL1 and SL2 may be determined based on a first distance and a second distance. The first distance may indicate a distance between the image pickup module and the object corresponding to the first images, and the second distance may indicate a distance between the image pickup module and the background corresponding to the second images. For example, when the first distance is shorter than the second distance in the zoom-in, the first scaling value SL1 may be greater than the second scaling value SL2.

When the first distance is shorter than the second distance in the zoom-out, the first scaling value SL1 may be smaller than the second scaling value SL2.

In some example embodiments, the first scaling value SL1 may decrease in the zoom-in as the first distance increases. The first scaling value SL1 may increase in the zoom-in as the first distance decreases. The first scaling value SL1 may increase in the zoom-out as the first distance increases. The first scaling value SL1 may decrease in the zoom-out as the first distance decreases. A change of the second scaling value SL2 may be similar to that of the first scaling value SL1.

In some example embodiments, the scaling value generation unit 180 may further receive a user setting signal USS. The user setting signal USS may be provided from a user of the image processing device 100*b* or an electronic system including the image processing device 100*b*. The scaling value generation unit 180 may determine the first and second scaling values SL1 and SL2 based on at least one of the depth information DI and the user setting signal USS.

Referring to FIG. 19, an image processing device 100*c* includes a processor and a memory (described later in regards to FIG. 21).

In some example embodiments, the processor may be programmed with instructions that configure the processor into a special purpose computer to perform the function of an image segmentation unit 120*c*, the stitching unit 140 and the rendering unit 170.

The image processing device 100*c* of FIG. 19 may be substantially the same as the image processing device 100*a* of FIG. 12, except that an operation and a configuration of the image segmentation unit 120*c* in FIG. 19 are different from those of the image segmentation unit 120 in FIG. 12.

The image segmentation unit 120*c* may further determine the first scaling value SL1 for the first panoramic image and the second scaling value SL2 for the second panoramic image based on the depth information DI. An operation of determining the first and second scaling values SL1 and SL2 in the image segmentation unit 120*c* may be substantially the same as the operation of the scaling value generation unit 180 that is described above with reference to FIG. 18. For example, the first and second scaling values SL1 and SL2 may be determined by a clustering unit (e.g., the element 124 in FIG. 9) included in the image segmentation unit 120*c*.

Although not illustrated in FIGS. 1, 12, 18 and 19, the image processing device according to example embodiments may further include at least one of an image pickup device and a depth measurement device.

In some example embodiments, each of the image processing devices 100, 100*a*, 100*b* and 100*c* of FIGS. 1, 12, 18 and 19 may include an image pickup device that simultaneously obtains the color information CI and the depth information DI for the plurality of input images. In this example, the image pickup device may include a 3D color image sensor, e.g., an RGBZ (red, green, blue, depth) sensor that includes depth pixels and color pixels in one pixel array.

In some example embodiments, each of the image processing devices 100, 100*a*, 100*b* and 100*c* of FIGS. 1, 12, 18 and 19 may include an image pickup device that obtains the color information CI for the plurality of input images and a depth measurement device that obtains the depth information DI for the plurality of input images. In this example, the image pickup device may include a 2D image sensor, e.g., an RGB (red, green, blue) sensor that includes color pixels. The depth measurement device may include a 3D image sensor, e.g., a depth sensor that includes depth pixels.

Although the example embodiments are described based on an example where the input images IIMG1~IIMG3 are divided into two types of images IMG11~IMG13 and IMG21~IMG23 (e.g., the object image and the background image), the example embodiments will be employed to an example where the input images are divided into any number of images.

In some example embodiments, an image segmentation unit (e.g., the element 120 in FIG. 1 or FIG. 12) may divide a plurality of input images that are sequentially captured into a plurality of first images, a plurality of second images and a plurality of third images. A stitching unit (e.g., the element 140 in FIG. 1 or FIG. 12) may generate a first panoramic image by synthesizing the plurality of first images, may generate a second panoramic image by synthesizing the plurality of second images, and may generate a third panoramic image by synthesizing the plurality of third images. For example, the stitching unit may include three stitching units (e.g., similar to the example of FIG. 10), or may include one stitching unit and one storage unit (e.g., similar to the example of FIG. 11). A rendering unit (e.g., the element 160 in FIG. 1) may generate an output panoramic image by combining the first, second and third panoramic images with one another.

In some example embodiments, a rendering unit (e.g., the element 170 in FIG. 12) may generate an output panoramic image by combining the first, second and third panoramic images with one another without scaling, or by scaling the first, second and third panoramic images with different ratios and combining the scaled first, second and third panoramic images with one another. For example, the rendering unit may include three scaling units (e.g., similar to the example of FIG. 16), or may include one scaling unit and one storage unit (e.g., similar to the example of FIG. 17).

Figure 20:
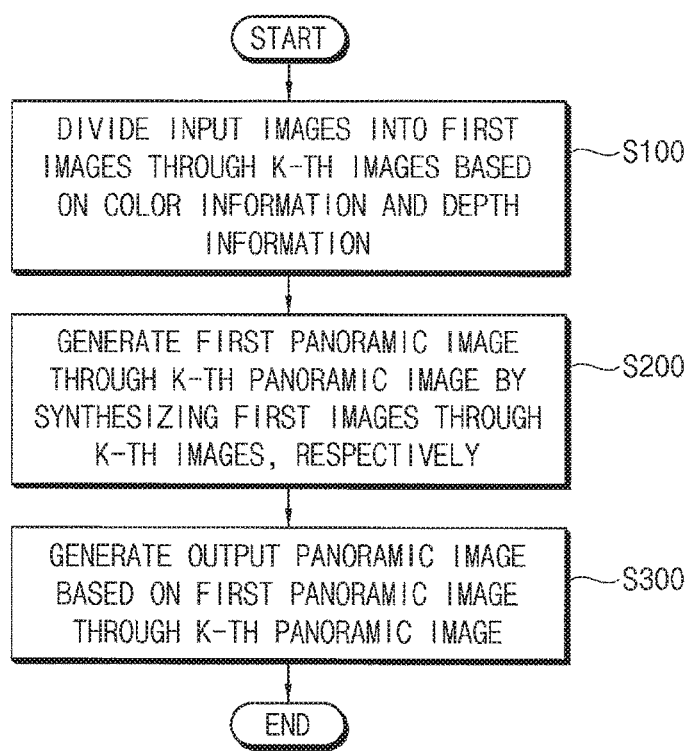
FIG. 20 is a flow chart illustrating a method of image processing according to example embodiments.

FIG. 20 is a flow chart illustrating a method of image processing according to example embodiments.

Referring to FIG. 20, in the method of the image processing according to example embodiments, in operation S100, the processor of the image processing device may divide a plurality of input images into a plurality of first images through a plurality of k-th images based on color information and depth information.

In performing operation S100, the plurality of input images that are divided may be sequentially captured. The color information and the depth information for the plurality of input images may be obtained in an initial operation time of the image processing, or may be stored in a storage unit and loaded from the storage unit in the initial operation time of the image processing. Each of the plurality of input images may constitute a portion of an output panoramic image. Each of the plurality of first images through the plurality of k-th images may be at least a portion of a respective one of the plurality of input images.

In operation S200, the processor may generate a first panoramic image through a k-th panoramic image by synthesizing the plurality of first images through the plurality of k-th images, respectively. For example, the first panoramic image may be generated by synthesizing (e.g., stitching) the plurality of first images. The k-th panoramic image may be generated by synthesizing (e.g., stitching) the plurality of k-th images.

In operation S300, the processor may generate the output panoramic image based on the first panoramic image through the k-th panoramic image.

In some example embodiments, as described above with reference to FIGS. 6 through 8, the processor may generate the output panoramic image by combining the first through k-th panoramic images with one another without scaling. In other example embodiments, as described above with reference to FIGS. 13 through 15, the processor may generate the output panoramic image by scaling the first through k-th panoramic images with different ratios and combining the first through k-th panoramic images with one another. These two example embodiments may be selectively performed.

In the method of the image processing according to example embodiments, the stitching operation for generating the panoramic image OIMG may be separately performed on portions in the plurality of input images IIMG1~IIMG3. Accordingly, the panoramic effect may be efficiently represented on the panoramic image OIMG. In addition, in the method of the image processing according to example embodiments, the scaling operation for generating the scaled panoramic image may be performed on portions in the panoramic image with different ratios, and the scaled panoramic image may be generate the scaled panoramic image OIMG' based on only the 2D scaling operation. Accordingly, the 3D perspective effect may be efficiently represented on the scaled panoramic image OIMG' in real time with a relatively small workload and low cost.

Figure 21:
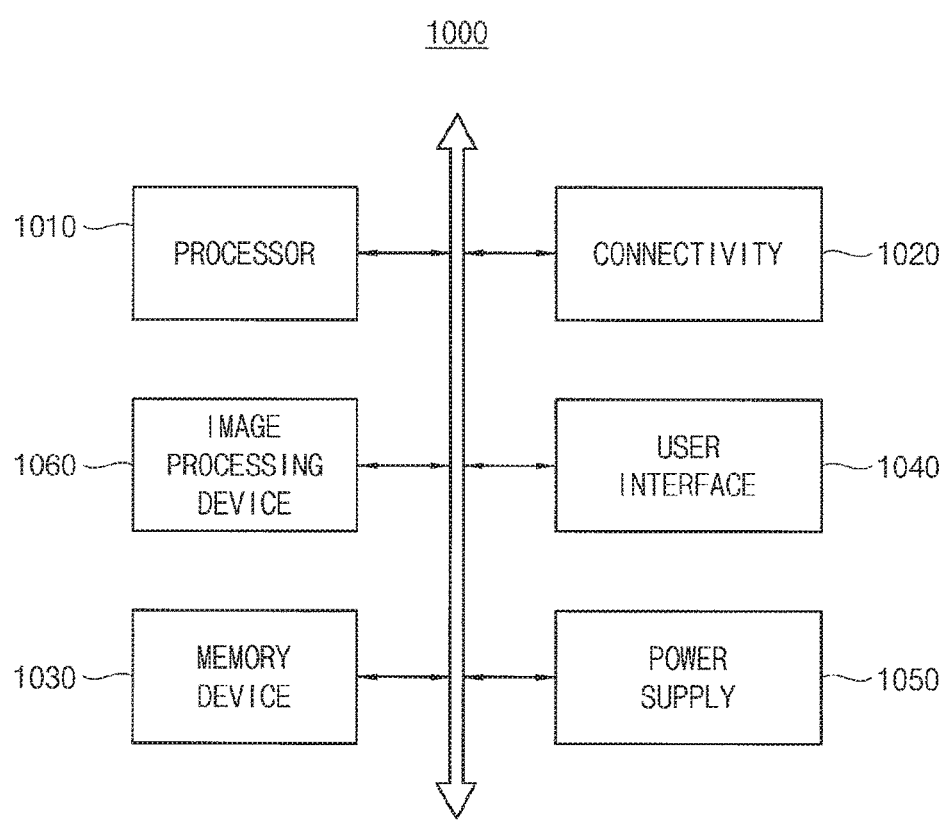
FIG. 21 is a block diagram illustrating an electronic system according to example embodiments.

FIG. 21 is a block diagram illustrating an electronic system according to example embodiments.

Referring to FIG. 21, an electronic system 1000 includes a processor 1010 and an image processing device 1060. The electronic system 1000 may further include a connectivity 1020, a memory device 1030, a user interface 1040 and a power supply 1050. The processor 1010 and the image processing device 1060 may be embodied on a semiconductor substrate.

The processor 1010 may perform various computational functions such as particular calculations and tasks. For example, the processor 1010 may be a Central Processing Unit (CPU), a microprocessor, an Application Processor (AP), etc. The processor 1010 may execute an operating system (OS) to drive the electronic system 1000, and may execute various applications for providing an internet browser, a game, a video, a camera, etc.

In some example embodiments, the processor 1010 may include a single processor core or multiple processor cores. In some example embodiments, the processor 1010 may further include a cache memory that is located inside or outside the processor 1010.

The connectivity 1020 may include an Input/Output (I/O) device configured to communicate with an external device. For example, the connectivity 1020 may communicate according to one of various types of protocols such as Universal Serial Bus (USB), Ethernet, Near Field Communication (NFC), Radio Frequency Identification (RFID), a Mobile Telecommunication like 4G and LTE, a memory card interface. For example, the connectivity 1020 may include a baseband chipset, and may support a communication such as GSM, GPRS, WCDMA, or HSxPA, etc.

The memory device 1030 may operate as data storage for data processed by the processor 1010 or a working memory. For example, the memory device 1030 may store a boot image for booting the electronic system 1000, a file system for the operating system to drive the electronic system 1000, a device driver for an external device connected to the electronic system 1000, and/or an application executed on the electronic system 1000. For example, the memory device 1030 may include a volatile memory such as a DRAM, a SRAM, a mobile DRAM, a Double Data Rate (DDR) Synchronous DRAM (SDRAM), a Low Power DDR (LPDDR) SDRAM, a Graphic DDR (GDDR) SDRAM, or a Rambus DRAM (RDRAM), etc., and a non-volatile memory such as an EEPROM, a flash memory, a PRAM, a RRAM, a NFGM, a PoRAM, a MRAM, a FRAM, etc.

The user interface 1040 may include at least one input device such as a keypad, a button, a microphone, a touch screen, etc., and/or at least one output device such as a speaker, or a display device, etc. The power supply 1050 may provide power to the electronic system 1000.

The image processing device 1060 is controlled by the processor 1010. The image processing device 1060 may be one of the image processing devices 100, 100a, 100b and 100c of FIGS. 1, 12, 18 and 19, and may operate according to the examples described with reference to FIGS. 1 through 20. For example, in the image processing device 1060, the stitching operation for generating the panoramic image may be separately performed on portions in the plurality of input images. Accordingly, the panoramic effect may be efficiently represented on the panoramic image. In addition, in the image processing device 1060, the scaling operation for generating the scaled panoramic image may be performed on portions in the panoramic image with different ratios, and the scaled panoramic image may be generated based on only the 2D scaling operation. Accordingly, the 3D perspective effect may be efficiently represented on the scaled panoramic image in real time with a relatively small workload and low cost. In some example embodiments, the image processing device 1060 may be included in the processor 1010.

In some example embodiments, the electronic system 1000 may further include a graphic processor (e.g., a graphic processing unit (GPU)) (not illustrated). The graphic processor may be separated from the processor 1010, and may perform at least one data processing associated with the image processing. For example, the data processing may include an image interpolation, a color correction, a white balance, a gamma correction, a color conversion, etc. In some example embodiments, the image processing device 1060 may be included in the graphic processor.

In some example embodiments, the electronic system 1000 may further include at least one of an image pickup device and/or a depth measurement device.

In some example embodiment, at least a portion of the operations for generating the panoramic image may be performed by instructions (e.g., a software program) that are executed by the image processing device 1060 and/or the processor 1010 and are stored in the memory device 1030. In other example embodiment, at least a portion of the operations for generating the panoramic image may be performed by hardware embodied in the image processing device 1060 and/or the processor 1010.

In some example embodiment, the electronic system 1000 may be any mobile system, such as a mobile phone, a smart phone, a tablet computer, a laptop computer, a personal digital assistants (PDA), a portable multimedia player (PMP), a digital camera, a portable game console, a music player, a camcorder, a video player, a navigation system, etc.

In some example embodiment, the electronic system 1000 may be any computing system, such as a personal computer (PC), a server computer, a workstation, a tablet computer, a laptop computer, a mobile phone, a smart phone, a PDA, a PMP, a digital camera, a digital television, a set-top box, a music player, a portable game console, a navigation device, etc.

According to example embodiments, the electronic system 1000 and/or components of the electronic system 1000 may be packaged in various forms, such as a package on package (PoP), a ball grid arrays (BGA), a chip scale packages (CSP), a plastic leaded chip carrier (PLCC), a plastic dual in-line package (PDIP), a die in waffle pack, a die in wafer form, a chip on board (COB), a ceramic dual in-line package (CERDIP), a plastic metric quad flat pack (MQFP), a thin quad flat pack (TQFP), a small outline IC (SOIC), a shrink small outline package (SSOP), a thin small outline package (TSOP), a system in package (SIP), a multi chip package (MCP), a wafer-level fabricated package (WFP), or a wafer-level processed stack package (WSP).

As will be appreciated by those skilled in the art, the present inventive concepts may be embodied as a system, method, computer program product, and/or a computer program product embodied in one or more computer readable medium(s) having computer readable program code embodied thereon. The computer readable program code may be provided to a processor of a general purpose computer, special purpose computer, or other programmable data processing apparatus. The computer readable medium may be a computer readable signal medium or a computer readable storage medium. The computer readable storage medium may be any tangible medium that can contain, or store a program for use by or in connection with an instruction execution system, apparatus, or device.

The present disclosure may be used in any device or system including the image processing device, such as a mobile phone, a smart phone, a PDA, a PMP, a digital camera, a digital television, a set-top box, a music player, a portable game console, a navigation device, a PC, a server computer, a workstation, a tablet computer, a laptop computer, a smart card, a printer, etc.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the present disclosure. Accordingly, all such modifications are intended to be included within the scope of the present disclosure as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. An image processing device comprising:
an image segmentation unit configured to divide a plurality of input images into first images and second images based on color information and depth information, the plurality of input images being sequentially captured and received by the image processing device;
a stitching unit configured to generate a first panoramic image and a second panoramic image by synthesizing the first images and the second images, respectively; and
a rendering unit configured to generate an output panoramic image based on the first panoramic image and the second panoramic image by,
combining the first panoramic image with the second panoramic image without scaling same, or
scaling the first and second panoramic images with different ratios based on a first scaling value and a second scaling value, respectively, and combining the scaled first panoramic image with the scaled second panoramic image to generate the output panoramic image.

2. The image processing device of claim 1, wherein the image segmentation unit comprises:
a color segmentation unit configured to generate a plurality of color data by performing a color classification on the plurality of input images based on the color information; and
a clustering unit configured to generate a plurality of first image data and a plurality of second image data based on the plurality of color data and the depth information, the plurality of first image data corresponding to the first images, the plurality of second image data corresponding to the second images.

3. The image processing device of claim 1, wherein the stitching unit comprises:
a first stitching unit configured to generate first panoramic image data corresponding to the first panoramic image based on a plurality of first image data corresponding to the first images; and
a second stitching unit configured to generate second panoramic image data corresponding to the second panoramic image based on a plurality of second image data corresponding to the second images.

4. The image processing device of claim 1, wherein the stitching unit comprises:
a first stitching unit configured to,
generate first panoramic image data corresponding to the first panoramic image based on a plurality of first image data corresponding to the first images, and
generate second panoramic image data corresponding to the second panoramic image based on a plurality of second image data corresponding to the second images; and
a storage unit configured to store the first panoramic image data and the second panoramic image data.

5. The image processing device of claim 1, further comprising:
an image pickup device configured to obtain the color information associated with the plurality of input images; and
a depth measurement device configured to obtain the depth information associated with the plurality of input images.

6. The image processing device of claim 1, wherein the rendering unit comprises:
a first scaling unit configured to generate a first conversion image by resizing the first panoramic image based on the first scaling value;
a second scaling unit configured to generate a second conversion image by resizing the second panoramic image based on the second scaling value, the second scaling value being different from the first scaling value; and
a blending unit configured to generate the output panoramic image by combining one of the first panoramic image with the second panoramic image and the first conversion image with the second conversion image.

7. The image processing device of claim 6, wherein
the first conversion image is an enlarged image of the first panoramic image, and the second conversion image is an enlarged image of the second panoramic image, and
the first scaling value indicating a magnification factor for the first panoramic image is greater than the second scaling value indicating a magnification factor for the second panoramic image.

8. The image processing device of claim 6, wherein the rendering unit further comprises:

a mode selection unit configured to select images that are combined by the blending unit.

9. The image processing device of claim 1, wherein the rendering unit includes:
a first scaling unit configured to,
generate a first conversion image by resizing the first panoramic image based on the first scaling value, and
generate a second conversion image by resizing the second panoramic image based on the second scaling value different from the first scaling value;
a blending unit configured to generate the output panoramic image by combining one of the first panoramic image with the second panoramic image and the first conversion image with the second conversion image; and
a storage unit configured to store first conversion image data corresponding to the first conversion image and second conversion image data corresponding to the second conversion image.

10. The image processing device of claim 1, further comprising:
a scaling value generation unit configured to determine the first scaling value for the first panoramic image and the second scaling value for the second panoramic image based on the depth information.

11. The image processing device of claim 1, wherein the image segmentation unit is further configured to determine the first scaling value for the first panoramic image and the second scaling value for the second panoramic image based on the depth information.

12. The image processing device of claim 1, wherein the first images and the first panoramic image are associated with an object in the plurality of input images, and
the second images and the second panoramic image are associated with a background other than the object in the plurality of input images.

13. The image processing device of claim 1, further comprising:
an image pickup device configured to obtain the color information and the depth information associated with the plurality of input images.

14. An electronic system comprising:
a processor; and
an image processing device controlled by the processor, the image processing device including,
an image segmentation unit configured to divide a plurality of input images into first images and second images based on color information and depth information, the plurality of input images being sequentially captured and received by the image processing device;
a stitching unit configured to generate a first panoramic image and a second panoramic image by synthesizing the first images and the second images, respectively; and
a rendering unit configured to generate an output panoramic image based on the first panoramic image and the second panoramic image by,
combining the first panoramic image with the second panoramic image without scaling same, or
scaling the first and second panoramic images with different ratios based on a first scaling value and a second scaling value, respectively, and combining the scaled first panoramic image with the scaled second panoramic image to generate the output panoramic image.

15. An image processing device comprising:
a memory configured to store input images representing a series of overlapping frames of a scene; and
a processor configured to,
generate a foreground panoramic image representing a foreground of the scene and a background panoramic image representing a background of the scene by,
scaling the foreground panoramic image by a first scaling ratio to generate a scaled foreground panoramic image,
scaling the background panoramic image by a second scaling ratio to generate a scaled background panoramic image, and
generate an output panoramic image by superimposing the scaled foreground panoramic image on the scaled background panoramic image.

16. A digital imaging device comprising:
an image pickup device configured to capture the input images as the image pickup device scans the scene; and
the image processing device of claim 15.

17. The image processing device of claim 15, wherein the processor is configured to,
segment the input images into foreground images and background images based on color information and depth information,
stitch a plurality of the foreground images together to generate the foreground panoramic image, and
stitch a plurality of the background images together to generate the background panoramic image.

18. The image processing device of claim 17, wherein the processor is configured to,
stitch the plurality of the foreground images together such that different slices from each of the foreground images are utilized to generate the foreground panoramic image, and
stitch the plurality of the background images together such that different slices from each of the background images are utilized to generate the background panoramic image.

* * * * *